(12) United States Patent
Takeda et al.

(10) Patent No.: US 7,510,337 B2
(45) Date of Patent: Mar. 31, 2009

(54) OPTICAL TRANSMISSION COMPONENT AND PRODUCTION METHOD THEREOF

(75) Inventors: Homare Takeda, Kusatsu (JP); Ryo Yamamoto, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/955,026

(22) Filed: Dec. 12, 2007

(65) Prior Publication Data
US 2008/0144999 A1    Jun. 19, 2008

(30) Foreign Application Priority Data
Dec. 14, 2006    (JP)    ............... 2006-336955

(51) Int. Cl.
*G02B 6/36*    (2006.01)
*G02B 6/38*    (2006.01)

(52) U.S. Cl. ............... 385/88; 385/65; 385/83; 385/86

(58) Field of Classification Search ........... 385/65, 385/83, 70, 86, 88, 89, 74, 79, 61, 93
See application file for complete search history.

(56) References Cited

U.S. PATENT DOCUMENTS

| | | | | |
|---|---|---|---|---|
| 4,666,238 | A * | 5/1987 | Borsuk et al. | 385/79 |
| 6,733,190 | B2 * | 5/2004 | Kuhara et al. | 385/94 |
| 6,798,969 | B2 * | 9/2004 | Matsumoto et al. | 385/137 |
| 7,095,922 | B2 * | 8/2006 | Fukuyama et al. | 385/33 |
| 7,310,460 | B2 * | 12/2007 | Ide et al. | 385/16 |

FOREIGN PATENT DOCUMENTS

JP    2003-107277 A    4/2003

OTHER PUBLICATIONS

English abstract of JP2003107277 published Apr. 9, 2003, the esp@cenet database, 1 page.

* cited by examiner

*Primary Examiner*—Charlie Peng
(74) *Attorney, Agent, or Firm*—Osha · Liang LLP

(57) ABSTRACT

An aspect according to the invention provides a method of producing an optical transmission component in which peel-off and a bubble are not generated within a keeping temperature range in a bonding agent with which a space between an optical function portion and an end face of an optical transmission line is filled while a holder portion for holding the optical transmission line such as an optical fiber and the optical function portion such as a lens array are integrally molded. An optical function array is disposed across the space from a fiber holder, and the optical function array including lenses and a lower-side holder portion are integrally molded by a transparent resin. Fiber cores are placed in V-shape grooves of the lower-side holder portion, and an upper-side holder portion is put on the fiber cores. End faces of the fiber cores face the space, and the space is filled with the bonding agent. When a linear expansion coefficient of the bonding agent is smaller (or larger) than the linear expansion coefficient of the connection portion that connects the optical function array and the lower-side holder portion, the bonding agent is cured at an atmosphere temperature higher than an upper limit (or lower than a lower limit) of a keeping temperature of the optical transmission component.

13 Claims, 21 Drawing Sheets

(a)

(b)

(a)

(b)

OPTICAL TRANSMISSION COMPONENT AND PRODUCTION METHOD THEREOF

BACKGROUND OF THE INVENTION

1. Field of the Invention

The present invention relates to an optical transmission component and a production method thereof, particularly to an optical transmission component and a method for producing the optical transmission component by assembling an optical transmission line such as an optical fiber and a holder having an optical function.

2. Description of the Related Art

FIG. 1 shows a schematic perspective view of a conventional optical transmission component (refer to, for example, Japanese Patent Application Laid-Open No. 2003-107277). An optical transmission component 11 includes an optical connector 12 and a lens array 13. In the optical connector 12, cores 17 of an optical fiber array 16 (tape core) are sandwiched between an upper-side holder 14 and a lower-side holder 15, and end faces of the cores 17 are exposed to a front face thereof. In the lens array 13, a plurality of lenses 18 are formed in a front face thereof, a pitch between the lenses 18 is equal to a pitch between the cores 17. A backside of the lens array 13 is bonded to a front face of the optical fiber array 16 with a bonding agent such that optical axes of the lenses 18 are aligned with center axes of the cores 17.

In the optical transmission component 11 having the above-described configuration, during a production process, it is necessary that the backside of the lens array 13 be bonded to the front face of the optical connector 12 with the bonding agent while the optical axes of the lenses 18 are aligned with the center axes of the cores 17, which results in cost increase and time-consuming assembling work or alignment.

Therefore, the inventors have an idea that the lens array is integrally molded with the holder portion of the optical connector from the beginning. When the lens array is integral with the holder portion, it is not necessary to bond the lens array to the optical connector, so that the optical axes of the lenses can automatically be aligned with the center axes of the cores by positioning the cores in the holder portion of the optical connector.

However, when the lens array is integral with the holder portion, there is generated a new problem. When a space is formed between the backside of the lens array and the end face of the core, the light is reflected by the end face of the core or the backside of the lens array, or the light leaks from the space, which results in a decrease in optical coupling efficiency. Although the space between the backside of the lens array and the end face of the optical connector is filled with the bonding agent, peel-off of the bonding agent or a bubble (micro peel-off) is generated in the backside of the lens array due to curing shrinkage after filling of the bonding agent and a difference in thermal expansion coefficient among the lens array, the holder, the bonding agent after curing, and a fiber material. The light is scattered due to the peel-off and the bubble, and the optical coupling efficiency is largely decreased between the optical fibers. The investigation shows that a difference in linear expansion coefficient between a resin portion (connection member) connecting the lens array and the optical connector and the bonding agent with which the space between the lens array and the optical connector is filled has a large influence on the generation of the peel-off and bubble rather than the curing shrinkage of the bonding agent.

In view of the foregoing, an object of the present invention is to provide an optical transmission component and a production method thereof, wherein the peel-off and the bubble are not generated within a keeping temperature range in the bonding agent with which the space between the optical function portion and the end face of the optical transmission line is filled while the holder portion for holding the optical transmission line such as the optical fiber and the optical function portion such as the lens array are integrally molded.

SUMMARY OF THE INVENTION

In accordance with a first aspect of the invention, a method of producing an optical transmission component includes the steps of performing integral resin molding while at least a part of an optical transmission line holder and an optical function portion are connected by a connection portion, the optical transmission line holder and the optical function portion being disposed with a space; holding the optical transmission line in the optical transmission line holder while an end face of the optical transmission line is located across the space from the optical function portion; filling a gap portion between the optical function portion and the end face of the optical transmission line with a bonding agent having a linear expansion coefficient smaller than that of the connection portion; and curing the bonding agent at an atmosphere temperature higher than an upper limit of a keeping temperature of the optical transmission component.

In the optical transmission component producing method according to the first aspect of the invention, because at least a part of the optical transmission line holder and the optical function portion are integrally molded by the resin while the connection portion is interposed, the trouble of aligning and assembling the optical function portion and the optical transmission line holder is saved. Because the number of components is decreased, the work of assembling the optical transmission component is decreased to reduce the production cost. Because the optical transmission line holder, the optical function portion, and the connection portion are formed by the resin molding, the degree of freedom is increased in the molding shape compared with the case in which the components are made of glass and the high-volume production can be achieved.

Additionally in the optical transmission component producing method according to the first aspect of the invention, when the gap portion between the optical function portion and the end face of the optical transmission line is filled with the bonding agent having the linear expansion coefficient smaller than that of the connection portion, the bonding agent is cured at the atmosphere temperature higher than the upper limit of the keeping temperature of the optical transmission component. Therefore, in the optical transmission component after the production, a compressive stress is generated in the bonding agent with which the gap portion between the optical function portion and the end face of the optical transmission line is filled. Accordingly, the peel-off and the micro bubble are hardly generated in the boundary of the bonding agent during the optical transmission component producing process and the keeping of the optical transmission component, so that a yield of the optical transmission component and product reliability can be improved.

In accordance with a second aspect of the invention, a method of producing an optical transmission component includes the steps of performing integral resin molding while at least a part of an optical transmission line holder and an optical function portion are connected by a connection portion, the optical transmission line holder and the optical function portion being disposed with a space; holding the optical transmission line in the optical transmission line holder while an end face of the optical transmission line is located across the space from the optical function portion; filling a gap portion between the optical function portion and the end face of the optical transmission line with a bonding agent having a linear expansion coefficient larger than that of the connection portion; and curing the bonding agent at an atmosphere temperature lower than a lower limit of a keeping temperature of the optical transmission component.

In the optical transmission component producing method according to the second aspect of the invention, because at least a part of the optical transmission line holder and the optical function portion are integrally molded by the resin while the connection portion is interposed, the trouble of aligning and assembling the optical function portion and the optical transmission line holder is saved. Because the number of components is decreased, the work of assembling the optical transmission component is decreased to reduce the production cost. Because the optical transmission line holder, the optical function portion, and the connection portion are formed by the resin molding, the degree of freedom is increased in the molding shape compared with the case in which the components are made of glass and the high-volume production can be achieved.

Additionally, in the optical transmission component producing method according to the second aspect of the invention, when the gap portion between the optical function portion and the end face of the optical transmission line is filled with the bonding agent having the linear expansion coefficient larger than that of the connection portion, the bonding agent is cured at the atmosphere temperature lower than the lower limit of the keeping temperature of the optical transmission component. Therefore, in the optical transmission component after the production, a compressive stress is generated in the bonding agent with which the gap portion between the optical function portion and the end face of the optical transmission line is filled. Accordingly, the peel-off and the micro bubble are hardly generated in the boundary of the bonding agent during the optical transmission component producing process and the keeping of the optical transmission component, so that the yield of the optical transmission component and product reliability can be improved.

In the optical transmission component producing method according to the first or second aspect of the invention, preferably the bonding agent is an ultraviolet curing resin having optical transparency in a wavelength band of light propagating through the optical transmission line. Therefore, because the bonding agent having the optical transparency is used, the light is hardly absorbed by the bonding agent to improve the optical coupling efficiency. Because the ultraviolet curing resin is used as the bonding agent, the bonding agent can be cured for a short time by irradiating the bonding agent with the ultraviolet light, and a change in device performance with time can be suppressed to the minimum in a reliability test concerning the temperature.

In the optical transmission component producing method according to the first aspect of the invention, preferably the atmosphere temperature is lower than a boiling point of the bonding agent when the bonding agent is cured. Therefore, when the bonding agent is cured at the atmosphere temperature higher than the upper limit of the keeping temperature of the optical transmission component, the bonding agent is cured at the temperature lower than the boiling temperature of the bonding agent, so that the bubble generated by boiling the bonding agent can be prevented from interrupting the optical path.

In the optical transmission component producing method according to the first aspect of the invention, preferably the atmosphere temperature is 5° C. to 15° C. higher than the upper limit of the keeping temperature when the bonding agent is cured. Therefore, because the bonding agent is cured at the temperature which is 5° C. to 15° C. higher than the upper limit of the keeping temperature, the compressive stress can properly be generated in the bonding agent, and the generation of the peel-off or bubble can be prevented in the bonding agent during the keeping of the optical transmission component. That is, the bubble is easily generated in the bonding agent when the temperature is at least 15° C. higher than the upper limit of the keeping temperature, and the peel-off or the micro bubble is easily generated in the boundary of the bonding agent when the temperature is lower than the upper limit of the keeping temperature by 5° C. or less.

In the optical transmission component producing method according to the second aspect of the invention, preferably the atmosphere temperature is a temperature at which the curing of the bonding agent is not interrupted. Therefore, when the bonding agent is cured at the atmosphere temperature lower than the lower limit of the keeping temperature of the optical transmission component, the atmosphere temperature is set to the temperature at which the curing of the bonding agent is not interrupted, so that the bonding agent can surely be cured.

In the optical transmission component producing method according to the first or second aspect of the invention, preferably the bonding agent with which the gap portion between the optical function portion and the end face of the optical transmission line is filled has a thickness of 10 μm or more. When the thickness of the bonding agent is lower than 10 μm, the peel-off and the micro bubble are easily generated in the boundary of the bonding agent due to the curing shrinkage.

In the optical transmission component producing method according to the first or second aspect of the invention, preferably the space is opened to an outside above the gap portion in which the optical function portion and the end face of the optical transmission line face each other, and the bonding agent is injected from an opened portion of the space into the gap portion between the optical function portion and the end face of the optical transmission line. Therefore, because the bonding agent can be injected from above the gap portion in which the optical function portion and the end face of the optical transmission line face each other, the gap is filled with the bonding agent by the bonding agent's own weight, the bonding agent is surely supplied into the gap portion, and a production yield of the optical transmission component can be improved.

In the optical transmission component producing method according to the first or second aspect of the invention, preferably a portion located above the gap portion in the space is filled with the bonding agent for replenishment when the bonding agent is injected into the gap portion between the optical function portion and the end face of the optical transmission line. Therefore, even if the curing shrinkage is generated in the bonding agent, because the bonding agent for replenishment located above the gap portion is replenished into the gap portion between the optical function portion and the end face of the optical transmission line, the surface shrinkage, the peel-off, and the micro bubble are hardly generated in the gap portion.

In accordance with a third aspect of the invention, an optical transmission line optical element in which at least a part of an optical transmission line holder and an optical function portion are disposed while a connection portion is interposed, the optical transmission line holder and the optical function portion being disposed with a space, and the optical transmission line is held in the optical transmission line holder while an end face of the optical transmission line is located across the space from the optical function portion, wherein a gap portion between the optical function portion and the end face of the optical transmission line is filled with a bonding agent to which a compressive stress is imparted.

In the optical transmission component according to the third aspect of the invention, because at least a part of the optical transmission line holder and the optical function portion are integrally molded by the resin while the connection portion is interposed, the trouble of aligning and assembling the optical function portion and the optical transmission line holder is saved. Because the number of components is decreased, the work of assembling the optical transmission component is decreased to reduce the production cost. Because the optical transmission line holder, the optical function portion, and the connection portion are formed by the resin molding, the degree of freedom is increased in the molding shape compared with the case in which the components are made of glass, and the high-volume production can be achieved.

Additionally, in the optical transmission component according to the third aspect of the invention, the gap portion between the optical function portion and the end face of the optical transmission line is filled with the bonding agent to which the compressive stress is imparted (bonding agent to which the compressive stress is applied within the keeping temperature range of the optical transmission component). Accordingly, the peel-off and the micro bubble are hardly generated in the boundary of the bonding agent during the optical transmission component producing process and the keeping of the optical transmission component, so that the yield of the optical transmission component and the product reliability can be improved.

In the optical transmission component according to the third aspect of the invention, preferably an inclined surface is formed in an inner surface of the space in order to cause the end face of the optical transmission line to abut on the inclined surface to align the end face of the optical transmission line. Therefore, the end face of the optical transmission line is caused to abut on the inclined surface in the space, whereby the optical transmission line can easily be aligned such that the gap having a predetermined distance is generated between the optical function portion and the end face of the optical transmission line.

In the optical transmission component according to the third aspect of the invention, preferably a projection is provided in the space in order to cause the end face of the optical transmission line to abut on the inclined surface to align the end face of the optical transmission line. Therefore, the end face of the optical transmission line is caused to abut on the projection in the space, whereby the optical transmission line can easily be aligned such that the gap having a predetermined distance is generated between the optical function portion and the end face of the optical transmission line.

In the optical transmission component according to the third aspect of the invention, preferably the optical transmission line holder is formed by putting an upper-side holder member on a lower-side holder member, and a V-shape groove is made in an upper surface of the lower-side holder member to hold the optical transmission line. Therefore, after the alignment is performed by placing the optical transmission line in the V-shape groove of the lower-side holder member, the upper-side holder member is put on the optical transmission line to hold the optical transmission line between the upper-side holder member and the lower-side holder member, so that the optical transmission component can simply be assembled with high accuracy.

In the optical transmission component according to the third aspect of the invention, preferably the optical transmission line holder has a hole to insert the optical transmission line, and an exhaust path is formed to exhaust air near the end face of the optical transmission line inserted into the hole to an outside. Therefore, the optical transmission line is inserted into the hole of the optical transmission line holder, and the bonding agent is injected into the gap portion, which allows the optical transmission component to be simply assembled. Because the exhaust path for exhausting the air near the end face of the optical transmission line to the outside is formed, the air remaining near the end face of the optical transmission line in injecting the bonding agent into a gap between the optical function portion and the end face of the optical transmission line can be prevented from interrupting a propagation of the optical information.

In the optical transmission component according to the third aspect of the invention, preferably the optical function portion has one or at least two lenses, prisms, or filters. Therefore, various functions can be added to the optical transmission component.

In accordance with a fourth aspect of the invention, a transmitting and receiving unit includes the optical transmission component according to the third aspect of the invention; and a transmitting and receiving device which transmits or receives optical information, wherein the transmitting and receiving device faces the optical function portion of the optical transmission component, and is disposed to be aligned with a center axis of the optical transmission line. Therefore, the optical transmission component of the present invention can be applied to the transmitting and receiving unit.

The means for solving the problem in the present invention has the features in which the above-described constituents are appropriately combined, and various variations can be made by the combination of the constituents in the invention.

BRIEF DESCRIPTION OF THE DRAWINGS

FIGS. 8A to 8C are subsequent to FIG. 7;

FIGS. 9A to 9C are subsequent to FIG. 7;

FIGS. 12A and 12B are subsequent to FIG. 11;

DETAILED DESCRIPTION OF THE PREFERRED EMBODIMENTS

Preferred embodiments of the invention will be described in detail with reference to the drawings.

First Embodiment

Figure 1:
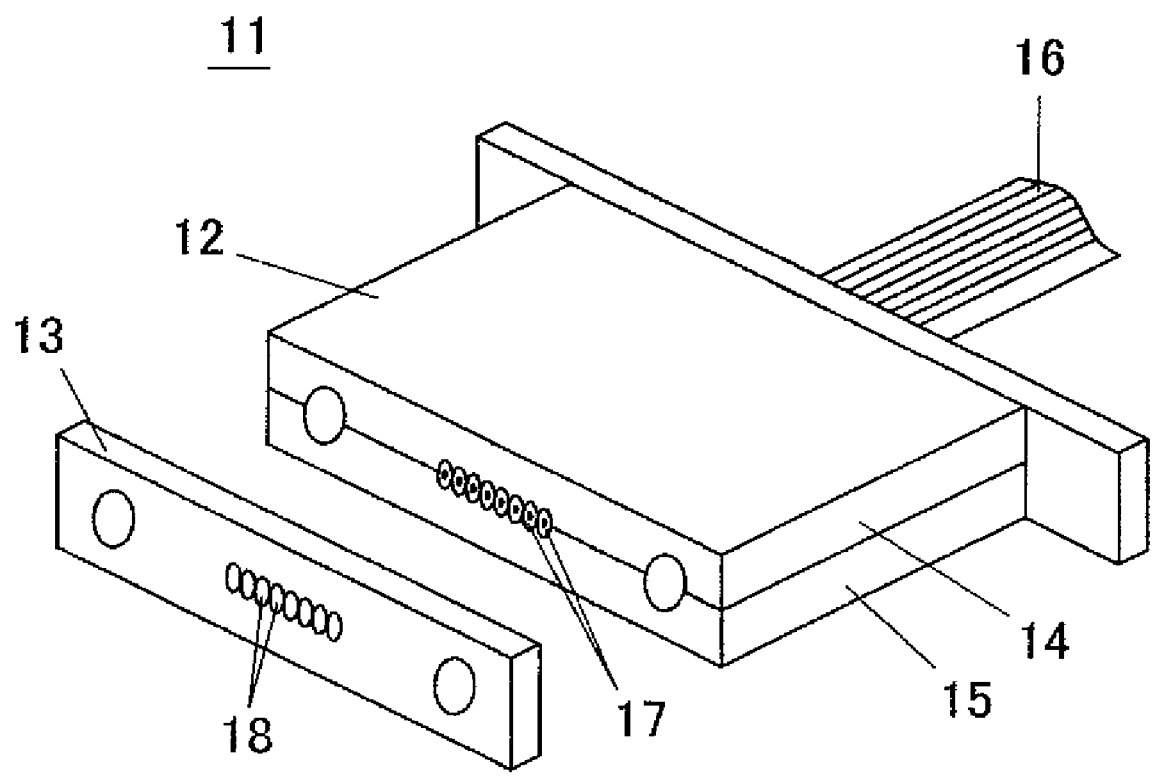
FIG. 1 schematically shows a perspective view of a conventional optical transmission component.
Figure 2:
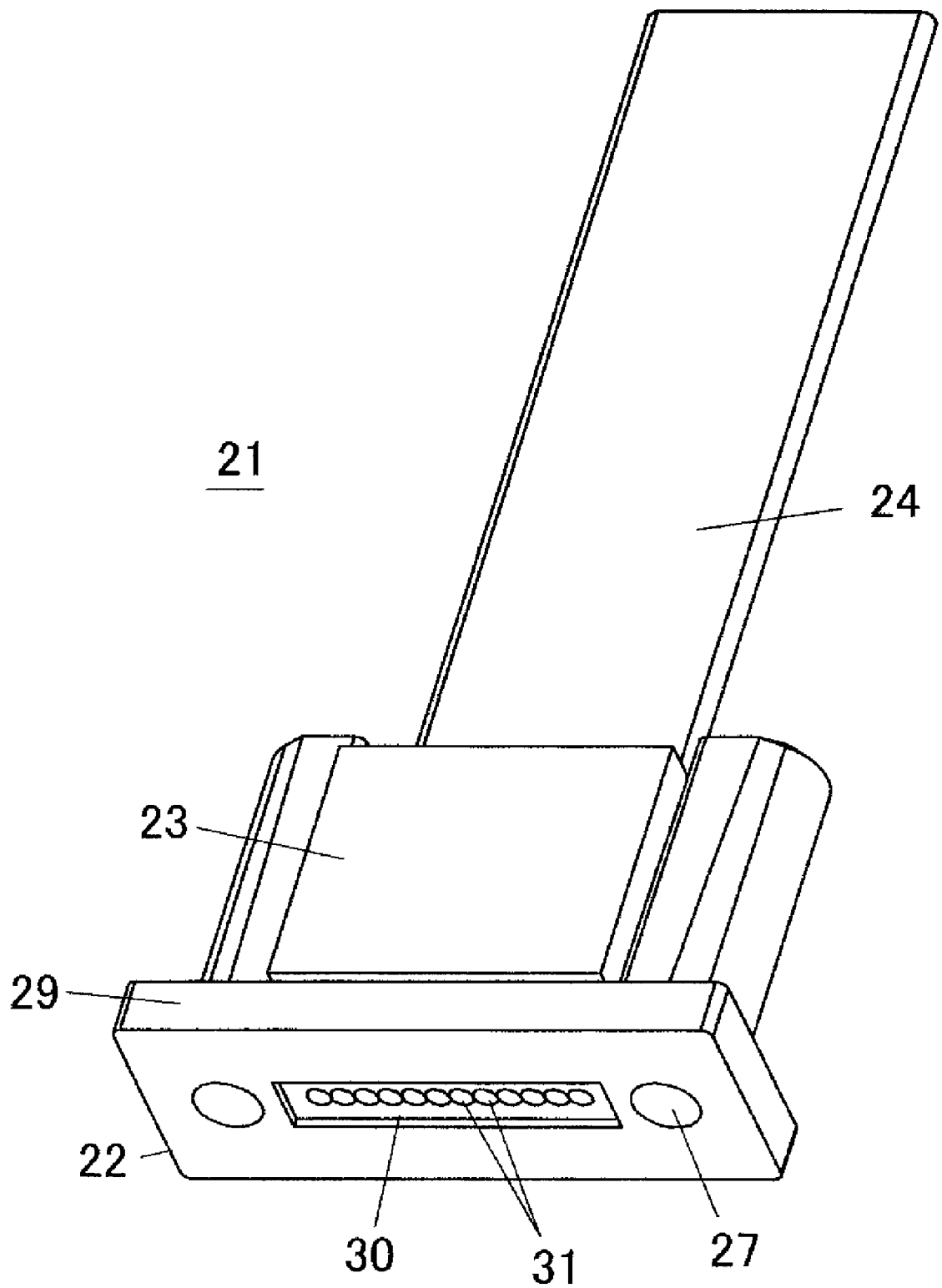
FIG. 2 shows a perspective view of an appearance of an optical transmission component according to a first embodiment of the present invention.
Figure 3:
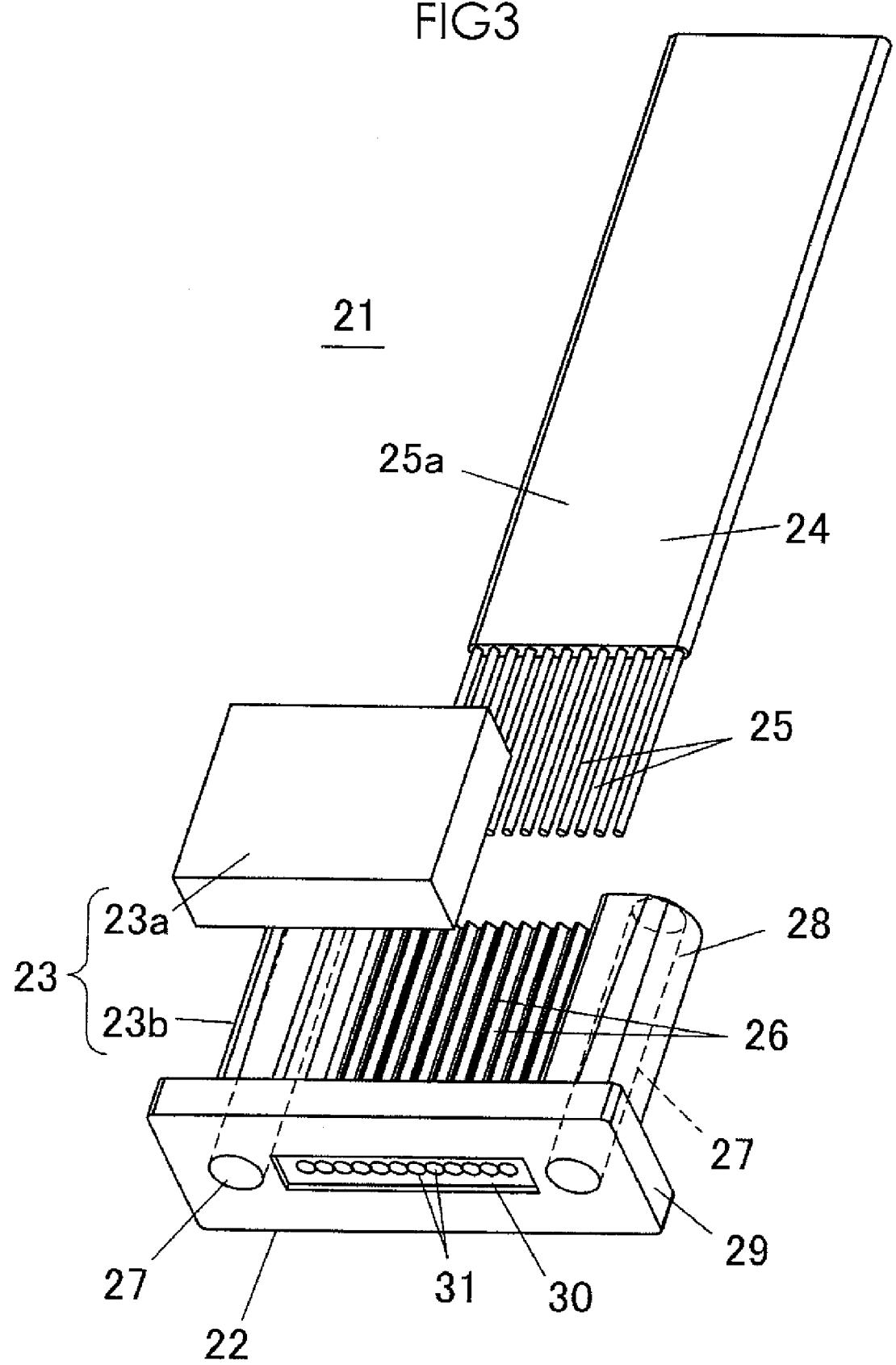
FIG. 3 shows an exploded perspective view of the optical transmission component of the first embodiment.
Figure 4:
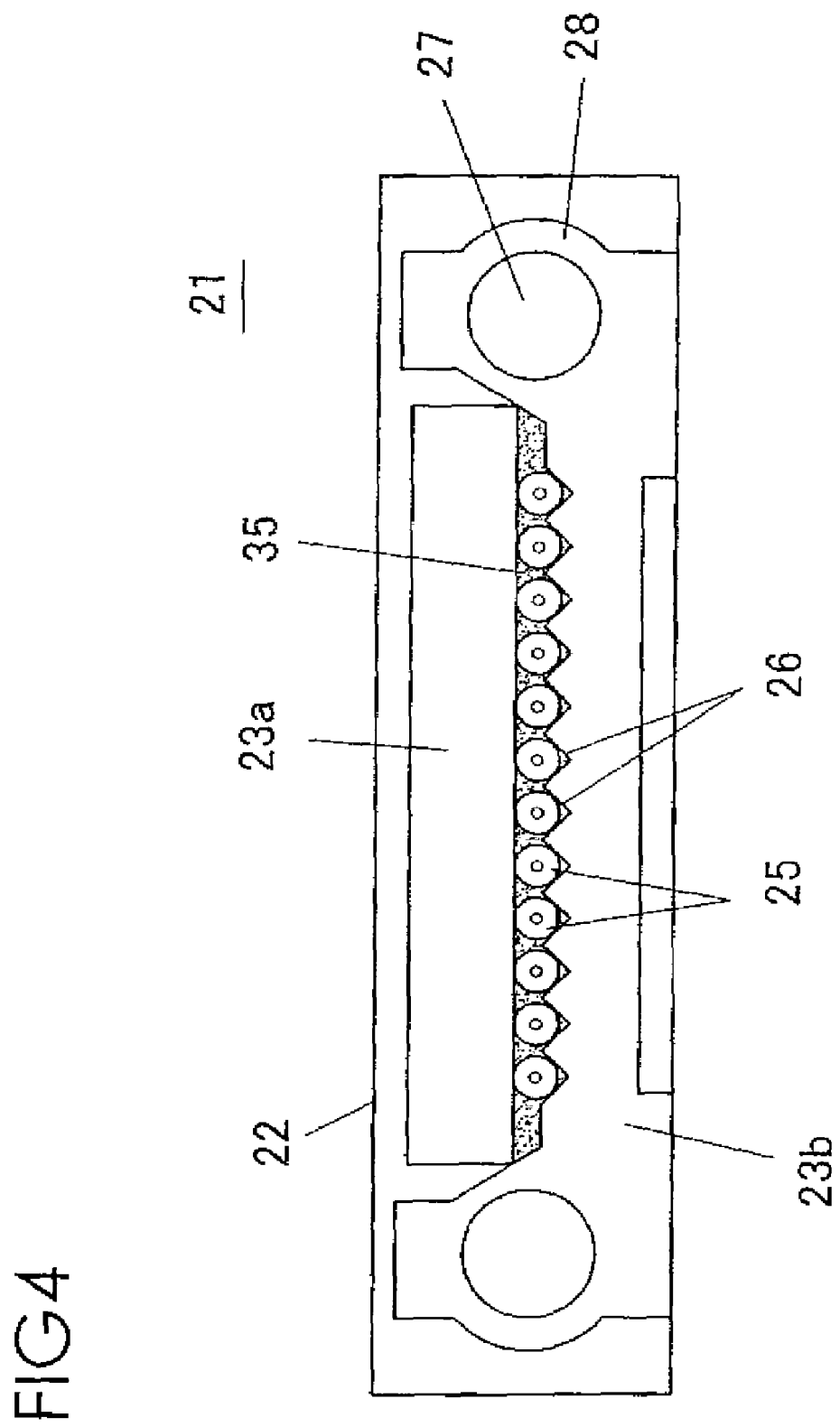
FIG. 4 shows a rear view of the optical transmission component of the first embodiment.
Figure 5:
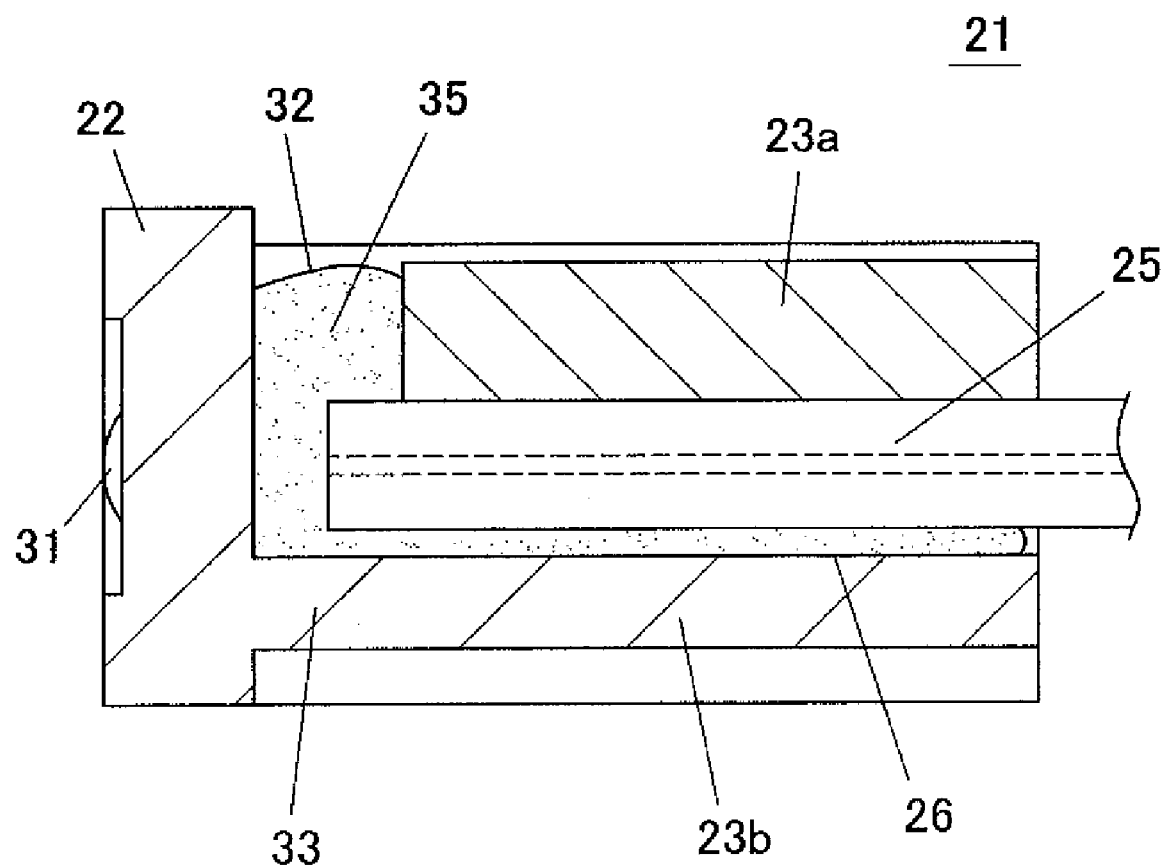
FIG. 5 shows a sectional view taken along a lengthwise direction of the optical transmission component of the first embodiment.
Figure 6:
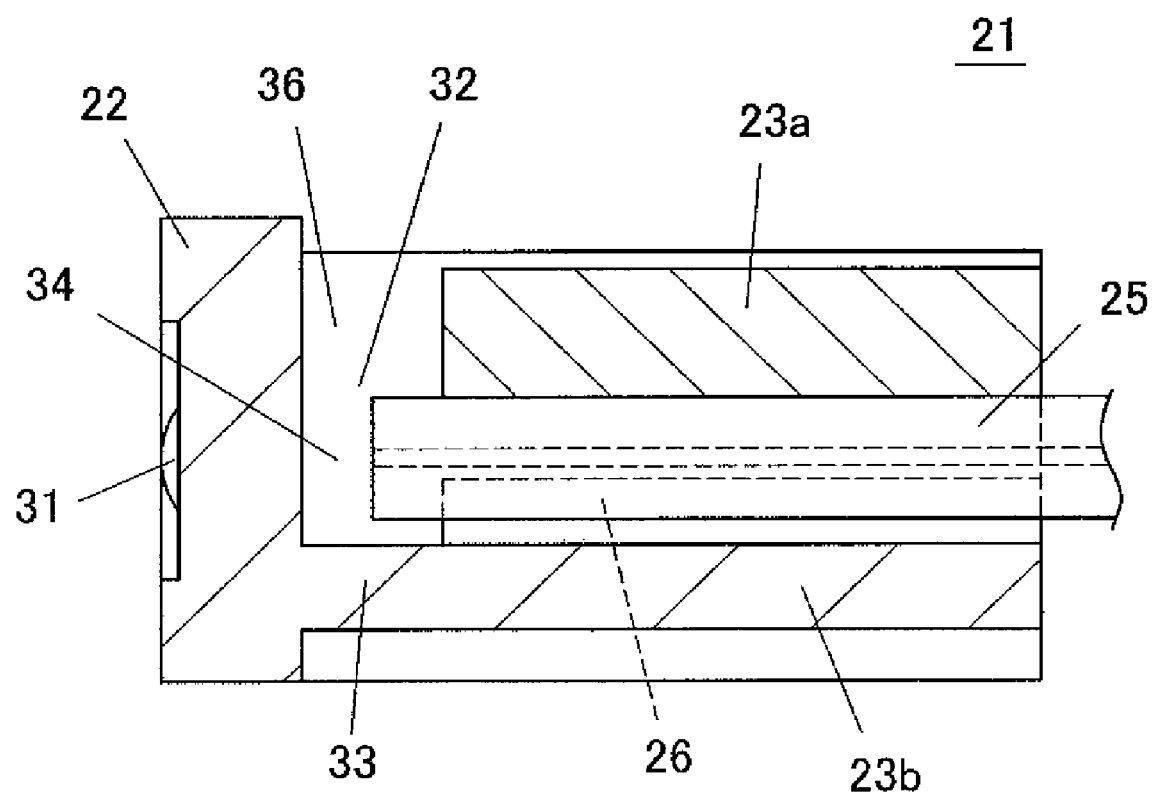
FIG. 6 shows a sectional view of the optical transmission component of the first embodiment before a bonding agent is injected.

FIG. 2 shows a perspective view of an appearance of an optical transmission component 21 according to a first embodiment of the present invention, and FIG. 3 shows an exploded perspective view of the optical transmission component 21. FIG. 4 shows a rear view of the optical transmission component 21, FIG. 5 shows a sectional view taken along a lengthwise direction of the optical transmission component 21, and FIG. 6 shows a sectional view of a state in which the bonding agent is removed from the sectional view of FIG. 5 in the optical transmission component 21.

The optical transmission component 21 includes an optical function array 22 (optical function portion), a fiber holder 23 (optical transmission line holder), and a fiber array 24. The fiber array 24 is a tape core including a plurality of fiber cores 25 which are of the optical transmission line. In the fiber array 24, the whole of the fiber cores 25 arranged in parallel at constant pitches are coated with an armoring coat material 25a.

The fiber holder 23 is divided into an upper-side holder portion 23a and a lower-side holder portion 23b. As shown in FIGS. 3 and 4, a plurality of V-shape grooves 26 are formed in parallel at the same pitches as those of the fiber cores 25 across the entire length of an upper surface of the lower-side holder portion 23b. Guide pin retaining portions 28 are formed on both sides of the lower-side holder portion 23b, and the guide pin retaining portion 28 has a guide pin insertion hole 27 into which a guide pin (not shown) is inserted. The guide pin retaining portion 28 is higher than an upper surface of a portion in which the V-shape groove 26 of the lower-side holder portion 23b is formed, and the upper-side holder portion 23a is accommodated between the right and left guide pin retaining portions 28 when the upper-side holder portion 23a is put on the V-shape groove 26. Although the upper-side holder portion 23a is formed in a flat shape in the drawings, the upper-side holder portion 23a may be formed in any shape as long as the upper-side holder portion 23a can press the fiber cores 25 which are fitted in and aligned with the V-shape grooves 26.

As shown in FIG. 2, in the optical function array 22, a rectangular recess 30 is formed in a front face of the rectangular substrate 29, and a plurality of lenses 31 are molded at the same pitches as those of the V-shape grooves 26 in the recess 30. Because the lenses 31 are recessed from the front face of the substrate 29, a flaw is hardly generated in the lenses 31 when the optical transmission component 21 is handled.

As shown in FIGS. 3 and 6, the lower-side holder portion 23b is integrally molded with the optical function array 22 such that a front face of the lower-side holder portion 23b is connected to a backside of the optical function array 22. Specifically, a space 32 is provided between the backside of the optical function array 22 and a front face of the holder 23, and the optical function array 22 and lower-side holder portion 23b located across the space 32 from the optical function array 22 are connected to each other by a connection portion 33. In the drawings, the connection portion 33 is located below the V-shape grooves 26 and in a front face of the guide pin retaining portion 28. However, the connection portion 33 may be provided at any position as long as the connection portion 33 interrupts the space between the end faces of the fiber cores 25 placed in the V-shape grooves 26 and the optical function array 22. The lenses 31 provided in the front face of the optical function array 22 are arranged such that the center axes of the fiber cores 25 are aligned with the optical axes of the lenses 31 when the fiber cores 25 are placed in the V-shape grooves 26. The guide pin insertion hole 27 made in the guide pin retaining portion 28 of the lower-side holder portion 23b is pierced to the front face of the optical function array 22.

The optical function array 22, the lower-side holder portion 23b, and the connection portion 33 are integrally molded with a transparent resin such that an optical signal propagating through the fiber core 25 and bonding agent curing ultraviolet light are transmitted. The upper-side holder portion 23a may be formed by a transparent glass plate (cover glass) or the transparent resin, or the upper-side holder portion 23a may be molded with an opaque material.

In the optical transmission component 21, because the lenses 31 are provided as the optical function in the front face of the optical function array 22, pieces of optical information outgoing from the fiber cores 25 can be outputted while condensed or parallelized with the lenses 31, or the pieces of optical information inputted to the lenses 31 can be condensed onto the end faces of the fiber cores 25.

As shown in FIGS. 4 and 5, in the optical transmission component 21, the fiber cores 25 placed on and aligned with the V-shape grooves 26 are sandwiched between the upper-side holder portion 23a and the lower-side holder portion 23b, a bonding agent 35 is injected into the space 32 and the V-shape grooves 26 and between the upper-side holder portion 23a and the lower-side holder portion 23b, and the bonding agent 35 is cured to perform the assembly.

Thus, in the optical transmission component 21, because the optical function array 22 and a part of the fiber holder 23, particularly the lower-side holder portion 23b including the V-shape grooves 26 are integrally molded, the time for the bonding the optical function array 22 to the fiber holder 23 or the time for aligning the lenses 31 and the fiber cores 25 is reduced in the assembly. Because the number of components is also decreased, the assembling work of the optical transmission component 21 is simplified to reduce the production cost. When the optical function array 22 or the fiber holder 23 is molded by glass, a molding shape is restricted, and the high-volume production is hardly performed. On the contrary, in the embodiment, because the optical transmission component 21 is molded by plastic, the degree of freedom is increased in the molding shape, and the high-volume production can be achieved.

A process of producing the optical transmission component 21 will be described below. First, a process of assembling the optical transmission component 21 with the bonding agent 35 having the linear expansion coefficient smaller than that of the connection portion 33 will be described with reference to FIGS. 7 to 9. When the fiber cores 25 are placed in the V-shape grooves 26 to put the upper-side holder portion 23a on the fiber cores 25, the space 32 having a depth ranging from an upper surface of the upper-side holder portion 23a to the lowest position of the V-shape groove 26 is formed between the backside of the optical function array 22 and a front face of the fiber holder 23. Hereinafter, in the space 32, a space between the end faces of the fiber cores 25 and the backside of the optical function array 22 is referred to as gap portion 34, and a space located above the gap portion 34 and between a front face of the upper-side holder portion 23a and the backside of the optical function array 22 is referred to as replenishment space 36.

In producing the optical transmission component 21, the integral molding product of the lower-side holder portion 23b, optical function array 22, and connection portion 33 is previously made of the transparent resin. The upper-side holder portion 23a is separately molded. In the fiber array 24, the armored portion of the front end portion is peeled to expose each fiber core 25 over a necessary length, and front ends of the fiber cores 25 are cut out in line.

Figure 7A:
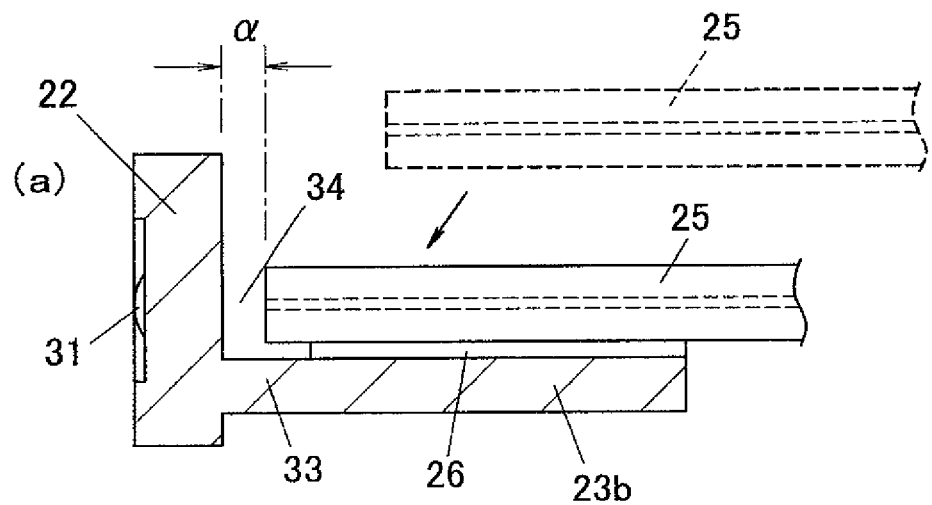
FIGS. 7A to 7C schematically show sectional views of a procedure for assembling the optical transmission component of the first embodiment.
Figure 8A:
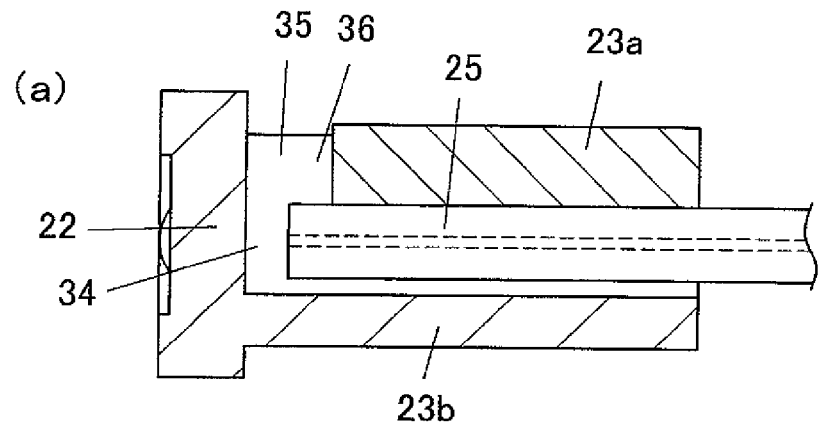
FIGS. 8A to 8C schematically show sectional views of the procedure for assembling the optical transmission component of the first embodiment.

In the process of assembling these components, as shown in FIG. 7A, the fiber cores 25 are aligned with the V-shape grooves 26 of the lower-side holder portion 23b, and the end faces of the fiber cores 25 face the backside of the optical function array 22. At this point, a distance α of the gap portion 34 between the end faces of the fiber cores 25 and the backside of the optical function array 22 is set in a range of 10 μm to 30 μm. When the distance α is lower than 10 μm, the peel-off and the micro bubble are easily generated at a boundary of the bonding agent 35 due to the curing shrinkage when the gap portion 34 is filled with the bonding agent 35. When the distance α is more than 30 μm, a tensile stress caused by the curing shrinkage is increased to easily generate the peel-off.

Figure 7B:
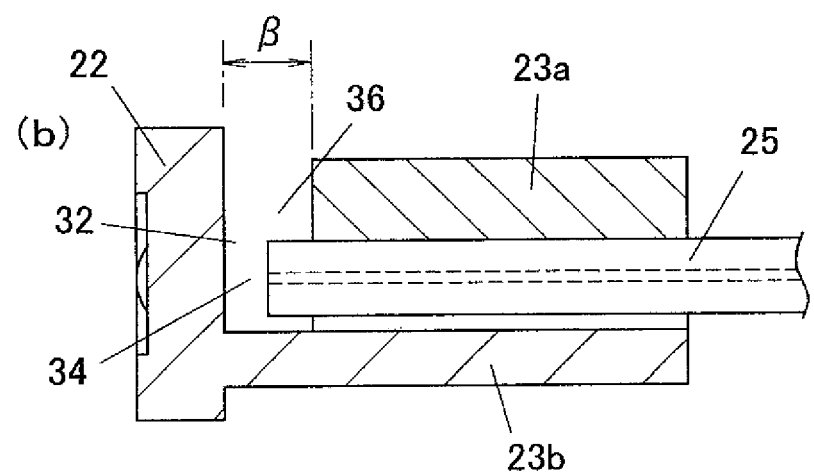

As shown in FIG. 7B, the upper-side holder portion 23a is placed on the fiber cores 25 to sandwich the fiber cores 25 between the upper-side holder portion 23a and the lower-side holder portion 23b. Alternatively, the bonding agent 35 may be applied to the V-shape grooves 26 to fill a gap between the V-shape groove 26 and the fiber core 25 with the bonding agent 35, and the bonding agent 35 may be applied between the fiber core 25 and the upper-side holder portion 23a.

Desirably a thickness β of the space 32, i.e., a distance between the backside of the optical function array 22 and the front face of the upper-side holder portion 23a is larger than a thickness α of the gap space 34 such that the sufficient amount of bonding agent 35 can be reserved in a replenishment space 36 above the gap portion 34. However, the curing shrinkage of the curing shrinkage is increased when the thickness β of the space 32 is excessively increased. Therefore, the thickness β of the space 32 is not more than 200 μm, and desirably the thickness β of the space 32 is not more than 50 μm.

Figure 7C:
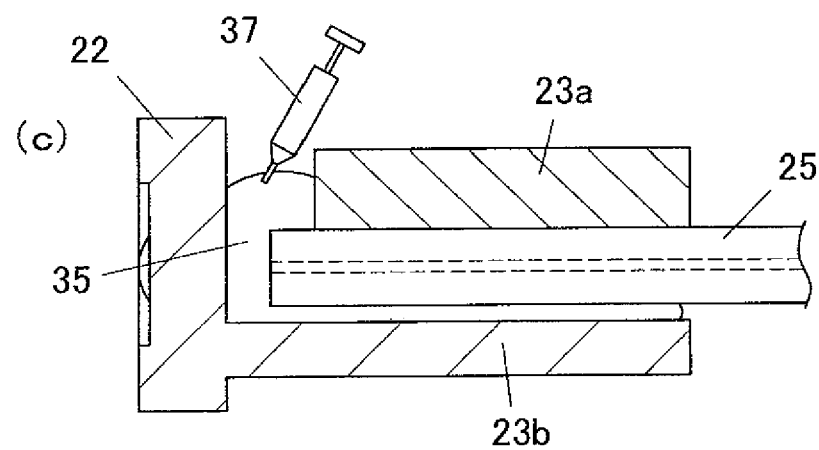

As shown in FIG. 7C, using a dispenser 37, the ultraviolet curing transparent bonding agent 35 is injected into the space 32 from the replenishment space 36 between the backside of the optical function array 22 and the front face of the upper-side holder portion 23a. The space 32 is filled with the injected bonding agent 35. At this point, the space 32 is sufficiently filled with the bonding agent 35 to the replenishment space 36 above the gap portion 34. Alternatively, when possible, the bonding agent 35 is not previously applied in the V-shape groove 26 and between the upper-side holder portion 23a and the fiber core 25, but the bonding agent 35 injected into the space 32 may flow into a gap between the lower surface of the upper-side holder portion 23a and the fiber core 25 and into the V-shape grooves 26.

Then, the optical transmission component 21 in assembly is placed in a high-temperature atmosphere. When the optical transmission component 21 is placed in the high-temperature atmosphere, as shown by an arrow of FIG. 8A, the integral molding product of the optical function array 22 and fiber holder 23, particularly the connection portion 33 is thermally expanded. Although a volume of the space 32 is increased with the thermal expansion of the connection portion 33, because the sufficient amount of bonding agent 35 is injected in the replenishment space 36, a boundary of the bonding agent 35 is not lowered below an upper end of the gap portion 34. Because the bubble is generated in the bonding agent 35 when the bonding agent 35 is boiled, it is necessary that the temperature at that time be set sufficiently lower than a boiling temperature of the bonding agent 35, and desirably the temperature is 5° C. to 15° C. higher than an upper limit of the keeping temperature (between −40° C. and 85° C.) of the optical transmission component 21. When the temperature is at least 15° C. higher than the upper limit of the keeping temperature, the bubble is easily generated in the bonding agent 35. When the temperature is lower than the upper limit of the keeping temperature by 5° C. or less, the peel-odd and the micro bubble are easily generated in the boundary of the bonding agent 35. Therefore, in the first embodiment, the atmosphere temperature is set to 100° C. The keeping temperature shall mean a temperature range between the upper limit and the lower limit of ambient temperature at which the optical transmission component 21 is exposed during the keeping or transportation.

Figure 8B:
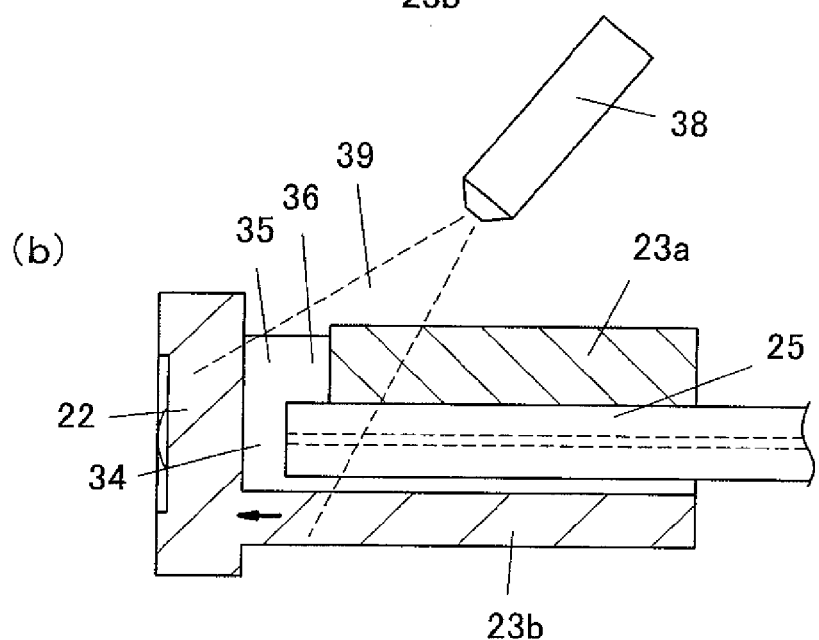
Figure 8C:
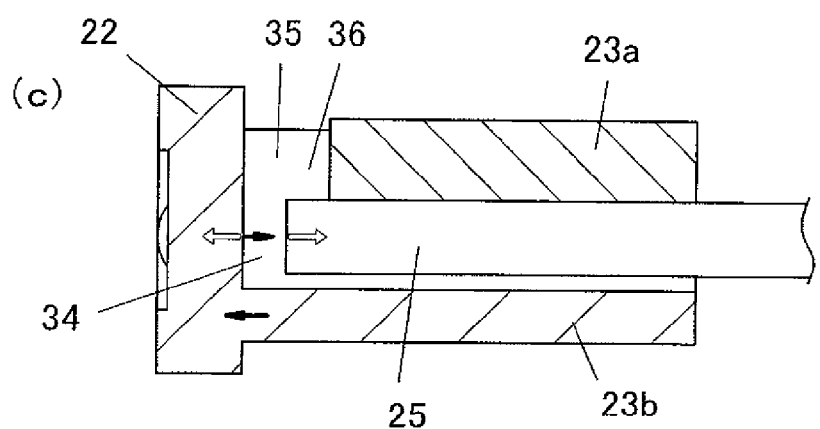
Figure 9A:
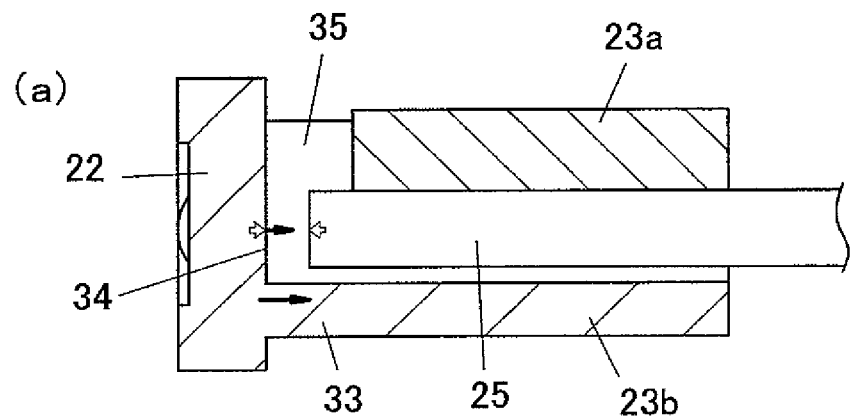
FIGS. 9A to 9C schematically show sectional views of the procedure for assembling the optical transmission component of the first embodiment.

While the optical transmission component 21 is retained in the high-temperature atmosphere, as shown in FIG. 8B, an ultraviolet light irradiation unit 38 irradiates the bonding agent 35 with ultraviolet light 39 to cure the bonding agent 35. Because the bonding agent 35 is an ultraviolet curing type bonding agent, the bonding agent 35 is cured by the ultraviolet light irradiation. At the same time, thermal curing also proceeds because the bonding agent 35 is retained in the high-temperature atmosphere. The thermal curing and the ultraviolet curing concurrently proceed during the process of producing the optical transmission component 21, so that the thermal curing can be reduced to prevent the bonding agent 35 from peeling during the keeping of the optical transmission component 21. Although the bonding agent 35 is irradiated from above with the ultraviolet light 39, the bonding agent 35 may be irradiated from below in the case of the opaque upper-side holder portion 23a.

When the ultraviolet curing and thermal curing are performed to the bonding agent 35, the curing shrinkage occurs in the bonding agent 35. However, because the replenishment space 36 is sufficiently filled with the bonding agent 35, surface shrink of the bonding agent 35 is not generated in the gap portion 34. The connection portion 33 is also compressed because the bonding agent 35 is bonded to both the backside of the optical function array 22 and the end faces of the fiber cores 25. When the curing shrinkage occurs in the bonding agent 35 as shown by a bold arrow of FIG. 8C, the tensile stress is generated in the bonding agent 35 as shown by an outline arrow of FIG. 8C. However, the peel-off or the bubble is not immediately generated in the gap portion 34.

Then, the optical transmission component 21 is naturally cooled to an aging temperature (standing to cool). The aging temperature is lower than the atmosphere temperature (100° C.) and higher than the upper limit of the keeping temperature. For example, the aging temperature ranges from 85° C. to 100° C. In the first embodiment, the aging temperature is set to 90° C. Because the linear expansion coefficient of the bonding agent 35 is smaller than the linear expansion coefficient of the connection portion 33, the connection portion 33 is thermally shrunk larger than the bonding agent 35 when the optical transmission component 21 is naturally cooled. Therefore, as shown by the outline arrow of FIG. 9A, the tensile stress acting on the bonding agent 35 of the gap portion 34 is changed to a compressive stress.

Figure 9B:
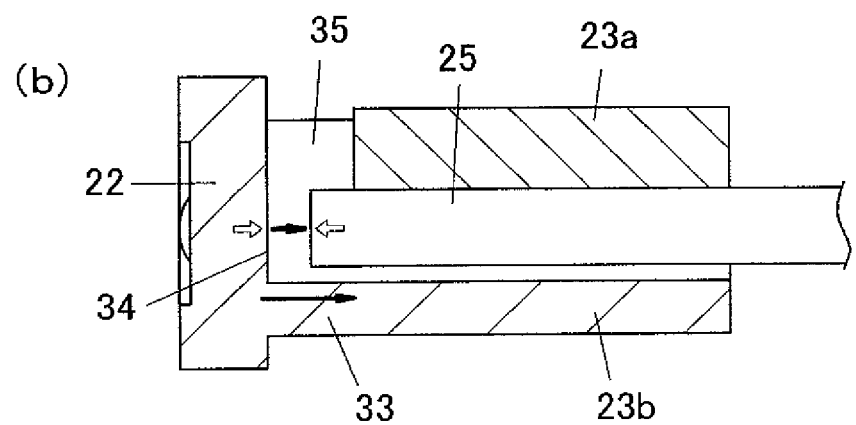
Figure 9C:
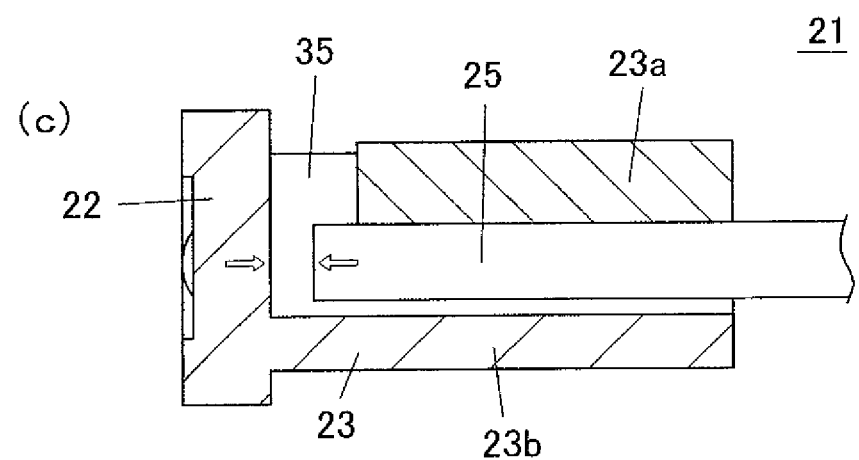

After the aging is performed for a predetermined time, the optical transmission component 21 is naturally cooled to room temperature (25° C.). When the optical transmission component 21 is naturally cooled to room temperature, because the connection portion 33 is thermally compressed larger than the bonding agent 35 as shown by the arrow of FIG. 9B, the compressive stress is eventually generated in the bonding agent 35 in the gap portion 34 as shown by the outline arrow of FIG. 9B. In the optical transmission component 21 produced in the above-described way, as shown in FIG. 9C, the compressive stress remains as a residual stress in the bonding agent 35, particularly the bonding agent 35 in the gap portion 34.

Figure 10A:
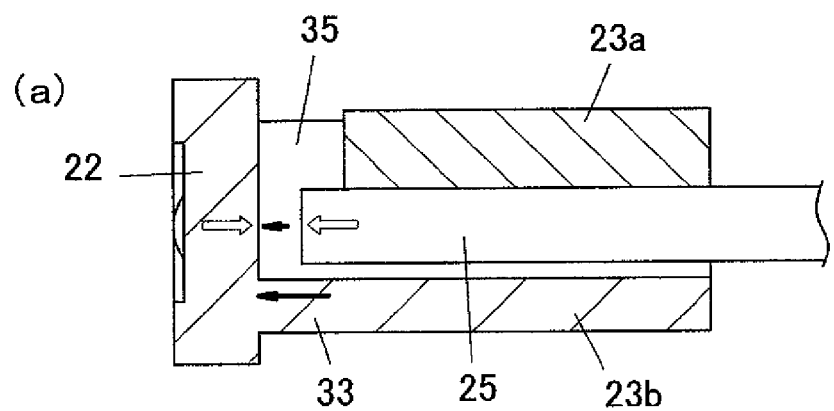
FIGS. 10A and 10B show action of the optical transmission component of the first embodiment.
Figure 10B:
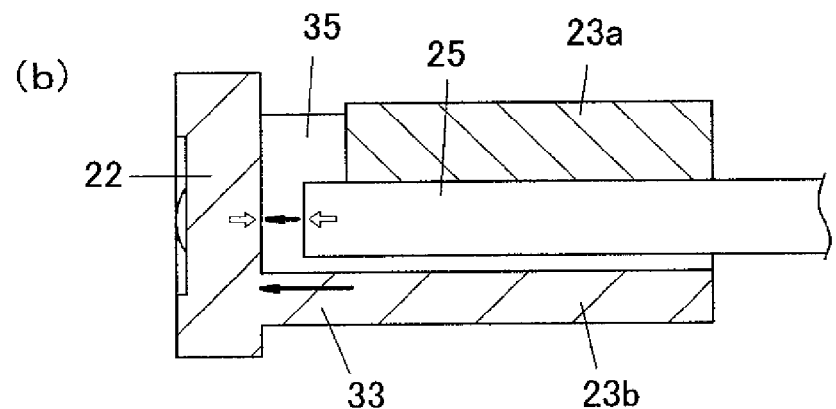

Thus, in the optical transmission component 21, because the space 32 is filled with the bonding agent 35 while the compressive stress acts on the bonding agent 35, the peel-off and the micro bubble are hardly generated in the boundary between the optical function array 22 and the bonding agent 35 during the keeping or use. Therefore, the yield of the optical transmission component and the product reliability can be improved. For example, FIG. 10A shows a state in which the atmosphere temperature of the optical transmission component 21 becomes 40° C. In this case, the compressive stress is decreased compared with the room temperature. However, the peel-off and the bubble are hardly generated because the compressive stress acting on the bonding agent 35 still remains. FIG. 10B shows a state in which the atmosphere temperature of the optical transmission component 21 becomes 85° C. In this case, the compressive stress is significantly decreased because the atmosphere temperature is slightly lower than the aging temperature. However, the peel-off and the bubble are hardly generated because the compressive stress acting on the bonding agent 35 remains slightly.

Although not shown, when the atmosphere temperature of the optical transmission component 21 becomes −40° C. which is of the lower limit of the keeping temperature, the atmosphere temperature becomes the lowest temperature with respect to the aging temperature, and the compressive stress becomes the maximum. That is, the peel-off and the bubble are hardly generated even in the atmosphere temperature of −40° C.

Then, a process of assembling the optical transmission component 21 with the bonding agent 35 having the linear expansion coefficient larger than that of the connection portion 33 will be described with reference to FIGS. 11 and 12. The process of filling the space 32 with the bonding agent 35 is similar to that of FIGS. 7A to 7C, so that the process of filling the space 32 with the bonding agent 35 is not given.

Figure 11A:
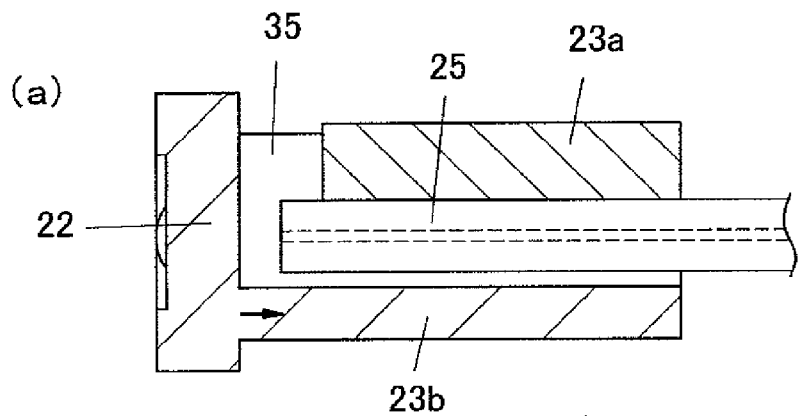
FIGS. 11A to 11C schematically show sectional views of another procedure for assembling the optical transmission component of the first embodiment.

After the space 32 is filled with the bonding agent 35, the optical transmission component 21 in assembly is placed in a low-temperature atmosphere. When the optical transmission component 21 is placed in the low-temperature atmosphere, as shown by the arrow of FIG. 11A, the integral molding product of the optical function array 22 and fiber holder 23, particularly the connection portion 33 is thermally compressed. Because the bonding agent 35 cannot thermally be cured when the atmosphere temperature is excessively low, it is necessary that the atmosphere temperature be set to a temperature at which the curing of the bonding agent 35 is not interrupted (temperature at which the bonding agent can be cured). In the first embodiment, the atmosphere temperature is set to −15° C. (the bonding agent which can be cured at −15° C. is used).

Figure 11B:
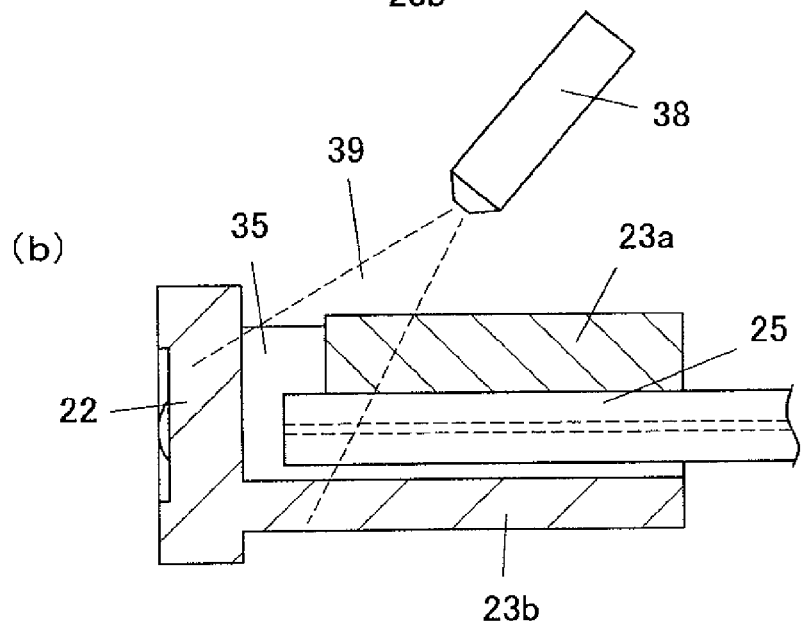

While the optical transmission component 21 is retained in the low-temperature atmosphere, as shown in FIG. 11B, the ultraviolet light irradiation unit 38 irradiates the bonding agent 35 with the ultraviolet light 39 to cure the bonding agent 35. In this case, the ultraviolet curing of the bonding agent 35 is slowly performed, so that a time for irradiating the bonding agent 35 with the ultraviolet light 39 is sufficiently ensured to cure the bonding agent 35.

Figure 11C:
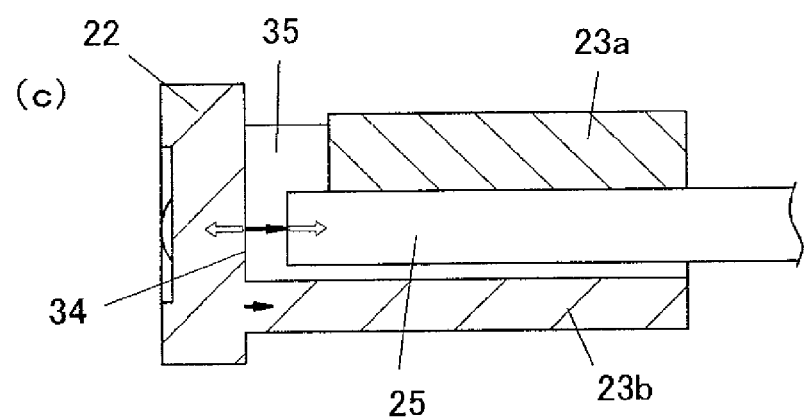

When the bonding agent 35 is cured to generate the curing shrinkage, the bonding agent 35 is also compressed, and the tensile stress is generated in the bonding agent 35 as shown by the outline arrow of FIG. 11C.

Figure 12A:
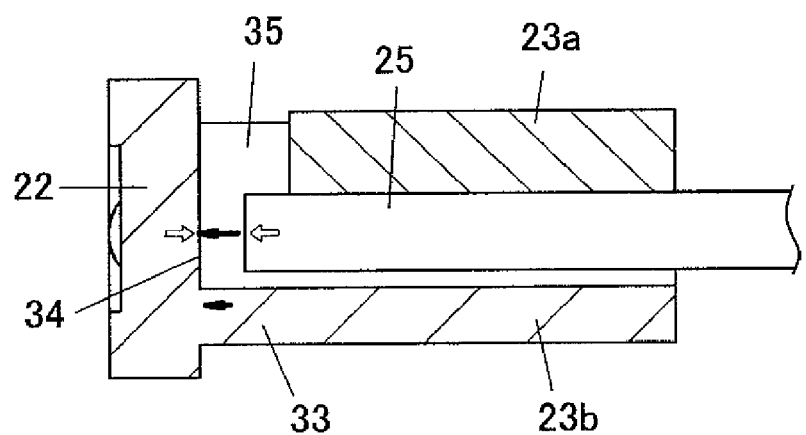
FIGS. 12A and 12B schematically show sectional views of the procedure for assembling the optical transmission component of the first embodiment.
Figure 12B:
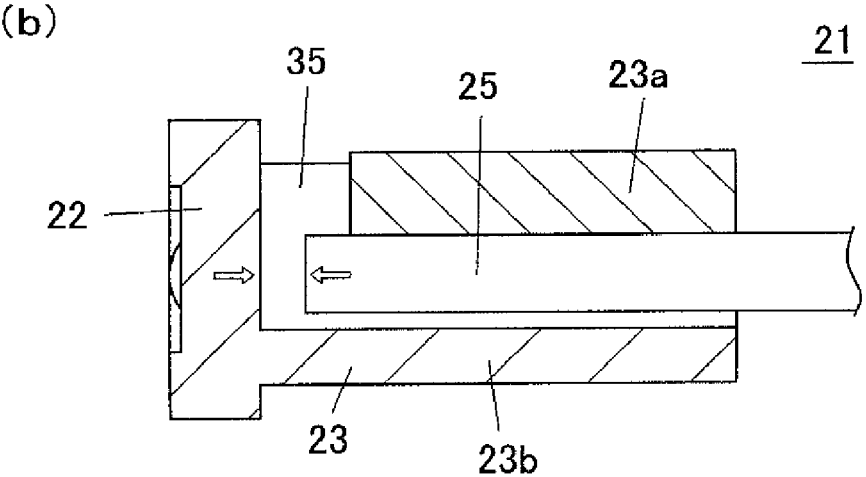

Then, the optical transmission component 21 is left until the atmosphere temperature becomes the room temperature (25° C.). When the atmosphere temperature is raised to the room temperature, because the bonding agent 35 is thermally expanded larger than the connection portion 33 as shown by the arrow of FIG. 12A, the compressive stress is generated in the bonding agent 35 of the gap portion 34 as shown by the outline arrow of FIG. 12A. In the optical transmission component 21 produced in the above-described way, as shown in FIG. 12B, the compressive stress remains as the residual stress in the bonding agent 35, particularly the bonding agent 35 in the gap portion 34.

Thus, in the optical transmission component 21, because the space 32 is filled with the bonding agent 35 while the compressive stress acts on the bonding agent 35, the peel-off and the micro bubble are hardly generated in the boundary between the optical function array 22 and the bonding agent 35 during the keeping or use. Therefore, the yield of the optical transmission component and the product reliability can be improved.

In the first embodiment, the V-shape grooves 26 are provided only in the upper surface of the lower-side holder portion 23b. Alternatively, the V-shape grooves 26 may be extended to an upper surface of the connection portion 33.

Second Embodiment

Figure 13:
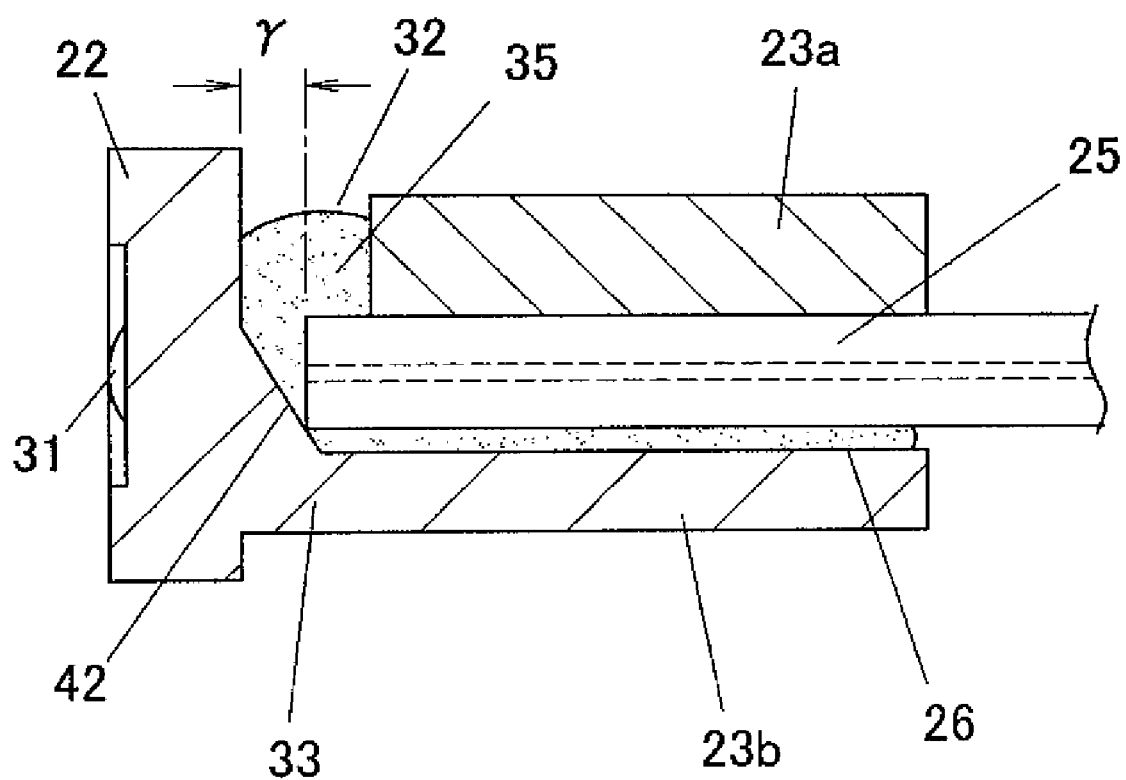
FIG. 13 schematically shows a sectional view of a configuration of an optical transmission component according to a second present embodiment of the invention.

FIG. 13 schematically shows a sectional view of a configuration of an optical transmission component 41 according to a second embodiment of the present invention. The optical transmission component 41 has the substantially same structure as the optical transmission component 21 of the first embodiment, so that only the different structure will be described (the same holds true for the following embodiments).

In the space 32 of the optical transmission component 41, an inclined surface 42 is formed over the whole width from a lower portion of the backside of the optical function array 22 to the upper surface of the connection portion 33. The fiber cores 25 are placed in the V-shape grooves 26, and the fiber cores 25 are pushed to cause the lower portions of the end faces of the fiber cores 25 to abut on the inclined surface 42, whereby a distance γ between the backside of the optical function array 22 and the end faces of the fiber cores 25 can be kept evenly.

The resin used in molding the optical function array 22 has a refractive index of about 1.5, and the bonding agent 35 has a refractive index of 1.45 to 1.5. In this case, the difference in refractive index between the resin and the bonding agent 35 has no influence on optical path refraction caused by the inclined surface 42.

Third Embodiment

Figure 14:
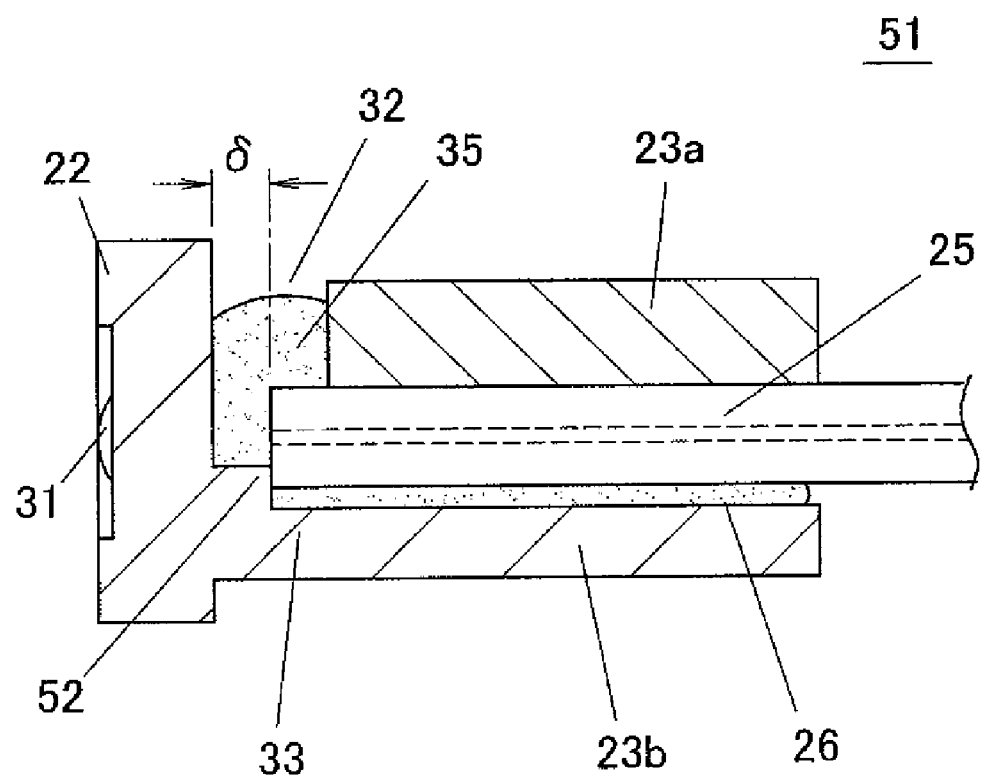
FIG. 14 schematically shows a sectional view of a configuration of an optical transmission component according to a third embodiment of the present invention.

FIG. 14 schematically shows a sectional view of a configuration of an optical transmission component 51 according to a third embodiment of the present invention. In the space 32 of the optical transmission component 51, a projection 52 is projected from a lower end portion in the backside of the optical function array 22. The projection 52 is formed over the whole width of the space 32. The fiber cores 25 are placed in the V-shape grooves 26, and the fiber cores 25 are pushed to cause the lower portions of the end faces of the fiber cores 25 to abut on the projection 52, whereby a distance δ between the backside of the optical function array 22 and the end faces of the fiber cores 25 can be kept evenly. Desirably the projection 52 is provided below a center portion of the fiber core 25 such that the center portion of the fiber core 25 is not caught by the projection 52.

Fourth Embodiment

Figure 15:
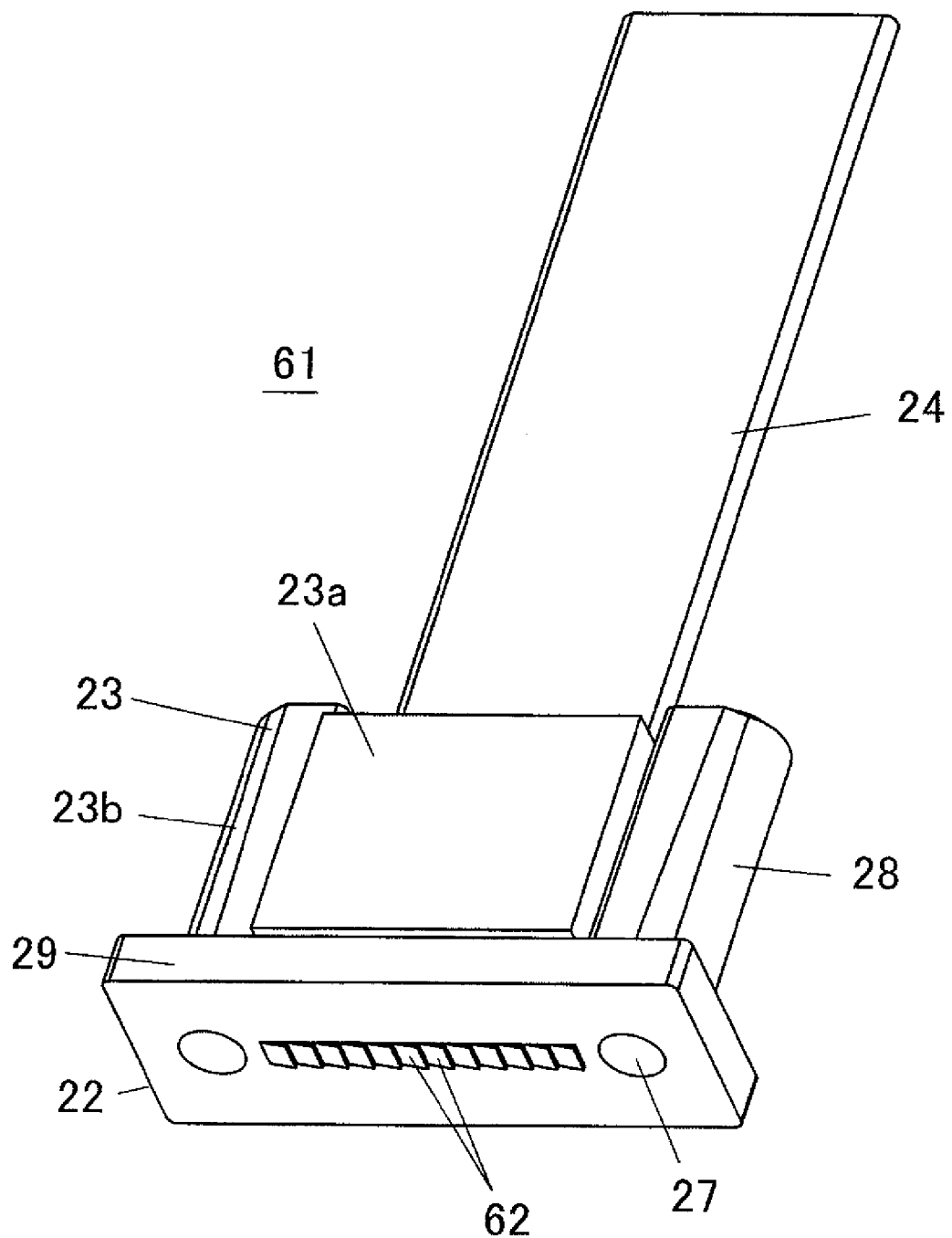
FIG. 15 schematically shows a perspective view of a configuration of an optical transmission component according to a fourth embodiment of the present invention.

FIG. 15 schematically shows a perspective view of a configuration of an optical transmission component 61 according to a fourth embodiment of the present invention. In the optical transmission component 61, a plurality of prisms 62 are provided as the optical function in the front face of the optical function array 22. Accordingly, the optical path of the optical information incident to and outgoing from the fiber core 25 can be bent by the prism 62.

Fifth Embodiment

Figure 16:
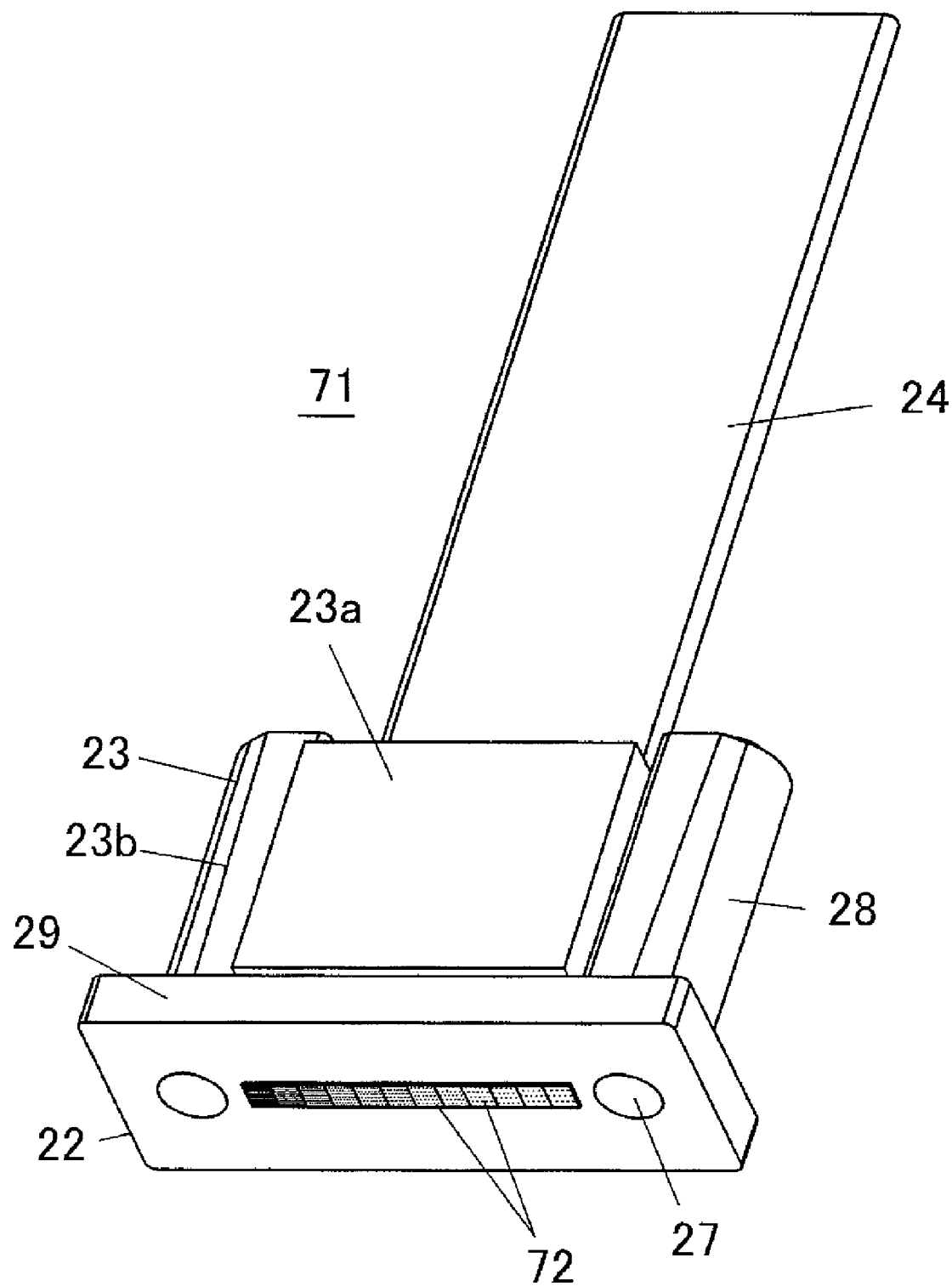
FIG. 16 schematically shows a perspective view of a configuration of an optical transmission component according to a fifth embodiment of the present invention.

FIG. 16 schematically shows a perspective view of a configuration of an optical transmission component 71 according to a fifth embodiment of the present invention. In the optical transmission component 71, a plurality of filters 72 having different transmission wavelength bands are provided as the optical function in the front face of the optical function array 22. Accordingly, in the pieces of optical information outgoing from the fiber cores 25, only the light having the particular wavelength band can be outputted to the outside, and only the light having the particular wavelength band can be coupled to the fiber core 25.

Sixth Embodiment

Figure 17:
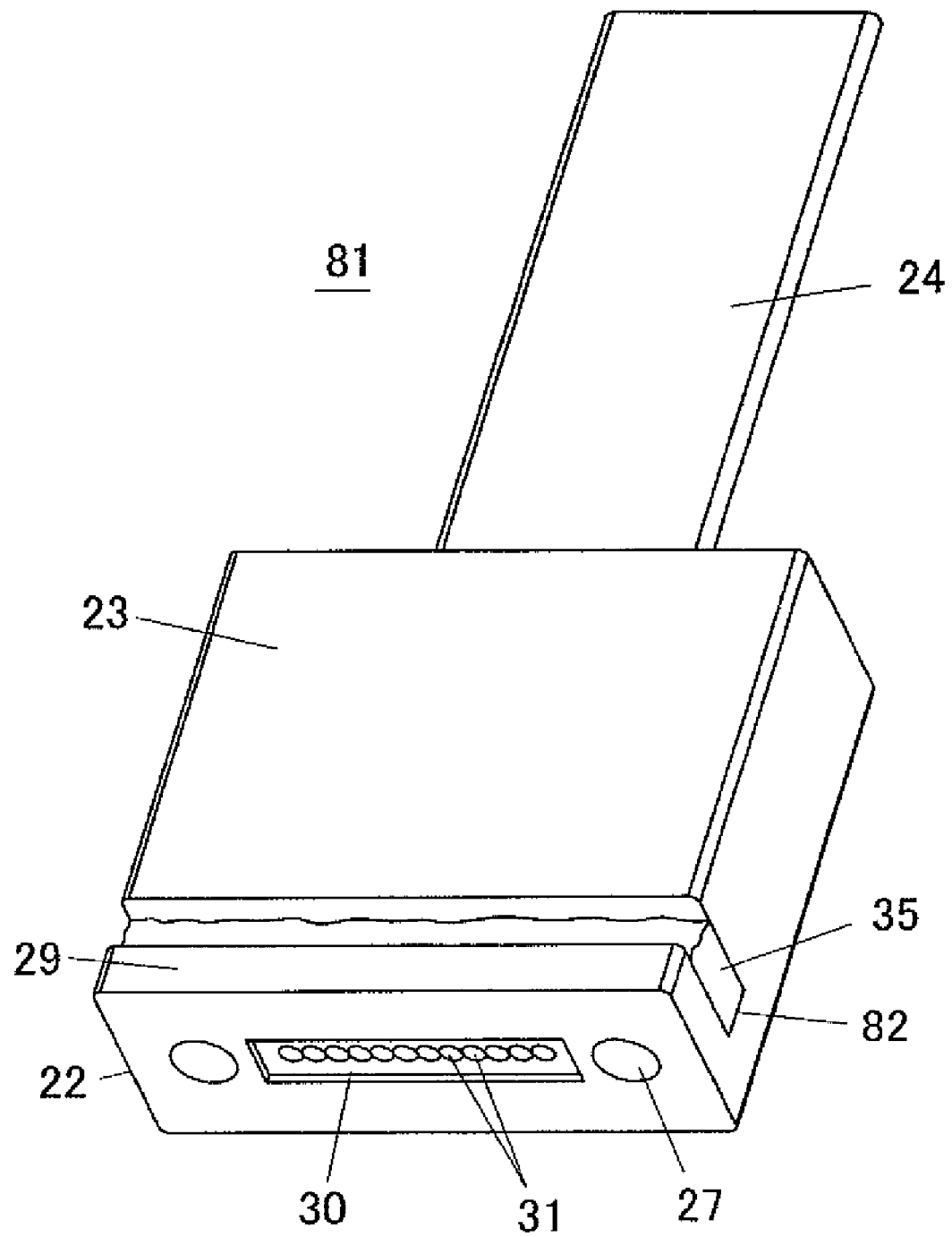
FIG. 17 schematically shows a perspective view of a configuration of an optical transmission component according to a sixth embodiment of the present invention.
Figure 18:
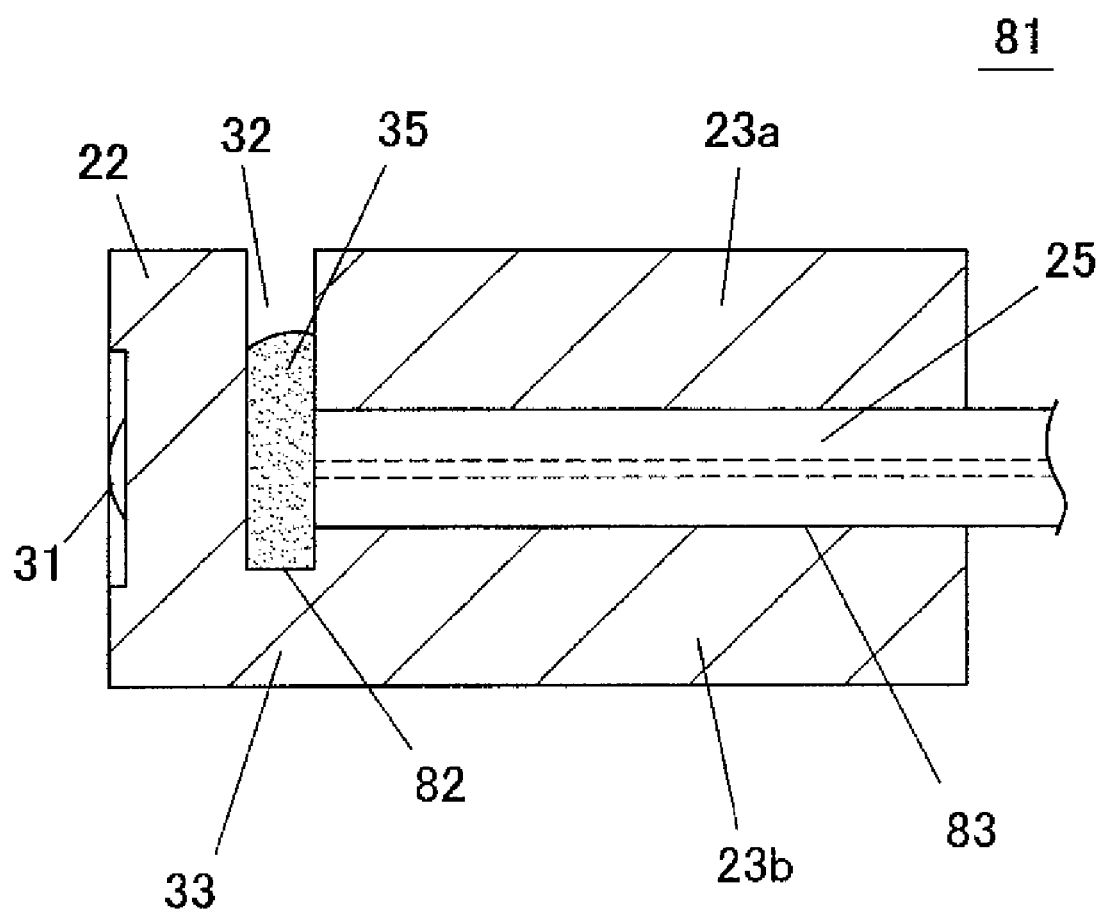
FIG. 18 shows a sectional view taken along a lengthwise direction of the optical transmission component of the sixth embodiment.
Figure 19A:
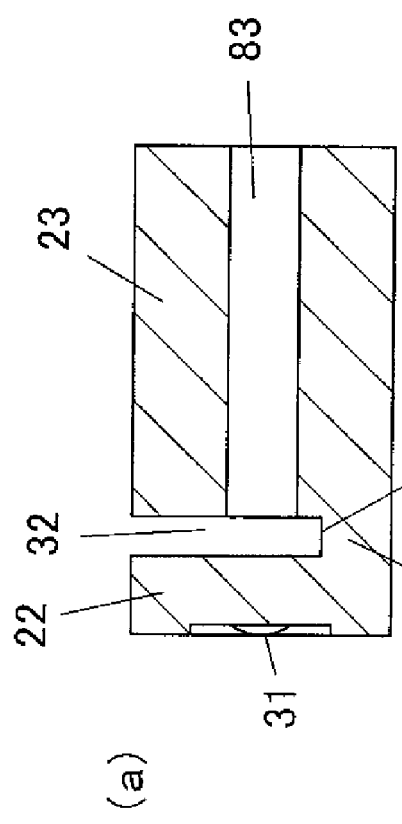
FIG. 19A shows a sectional view of an integral molding product of an optical function array and a fiber holder used in the optical transmission component of the sixth embodiment.

FIG. 17 schematically shows a perspective view of a configuration of an optical transmission component 81 according to a sixth embodiment of the present invention, and FIG. 18 shows a sectional view taken along the lengthwise direction of the optical transmission component 81. FIG. 19A shows a sectional view of the integral molding product of the optical function array 22 and fiber holder 23, and FIG. 19B shows a rear view of the integral molding product.

Figure 19B:
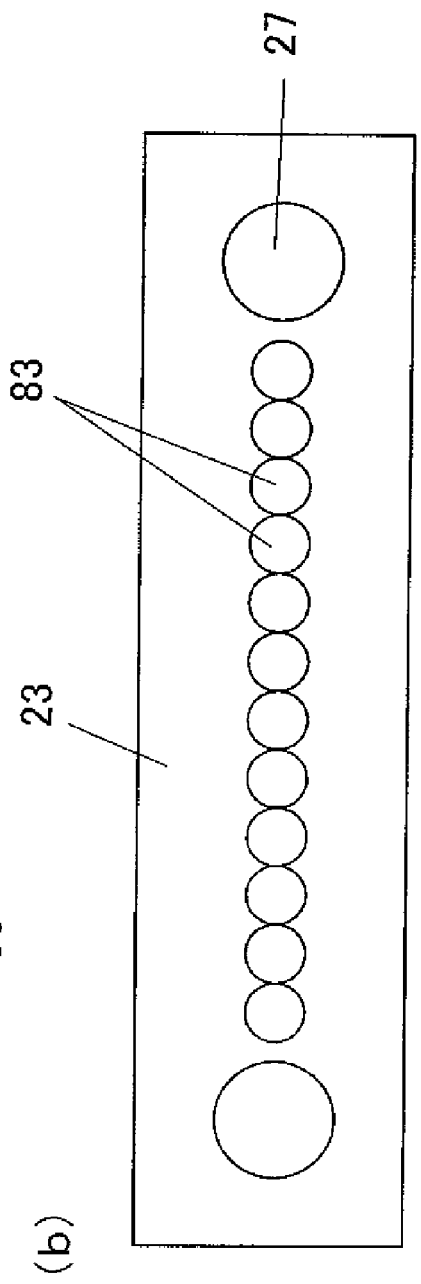
FIG. 19B shows a rear view of the integral molding product.

As shown in FIGS. 19A and 19B, in the optical transmission component 81, the optical function array 22 and the fiber holder 23 are integrally molded by the transparent resin, and a groove 82 is made downward from the upper surface between the optical function array 22 and the fiber holder 23. The inside of the groove 82 constitutes the space 32, and the connection portion 33 is formed below the groove 82. Unlike the first embodiment, the fiber holder 23 is not divided into two parts, but the fiber holder 23 is formed in the single part. In the fiber holder 23, a plurality of holes 83 are made from the front face to the backside to insert and align the fiber core 25. The center axes of the holes 83 are made so as to be aligned with the optical axes of the lenses 31.

As shown in FIGS. 17 and 18, in the optical transmission component 81, the fiber cores 25 are inserted into the holes 83 in the fiber holder 23 to cause the end faces of the fiber cores 25 to face the space 32, the bonding agent 35 is injected from the upper surface of the space 32, and the bonding agent 35 is cured by the ultraviolet light irradiation. In injecting the bonding agent 35, air near the end faces of the fiber cores 25 is exhausted from side faces of the space 32. The replenishment space 36 shown in FIGS. 7 and 8 may be provided above the space 32 to prevent the surface shrinkage of the bonding agent 35 in the gap portion 34.

Accordingly, the number of components can be decreased in the optical transmission component 81.

The optical transmission component 81 can be produced in the same way as the first embodiment (FIGS. 7 to 9 and FIGS. 11 and 12) in both the case in which the linear expansion coefficient of the bonding agent 35 is larger than the linear expansion coefficient of the connection portion 33 and the case in which the linear expansion coefficient of the bonding agent 35 is smaller than the linear expansion coefficient of the connection portion 33.

Seventh Embodiment

Figure 20A:
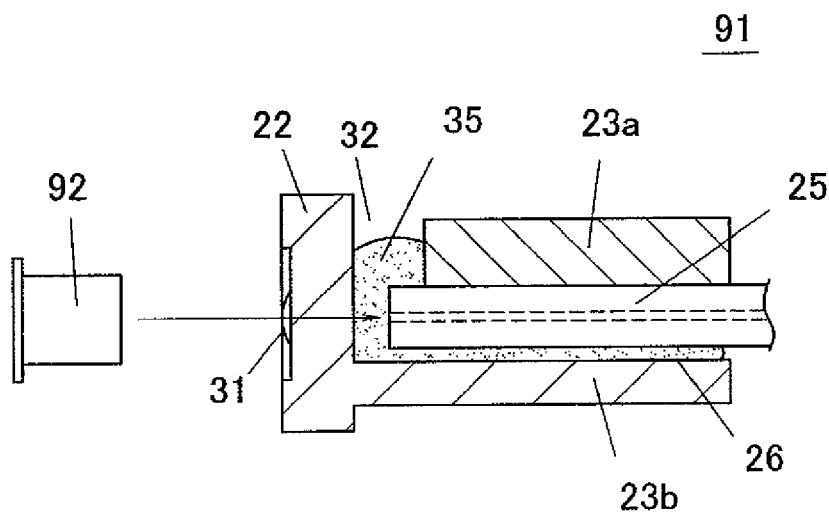
FIG. 20A schematically shows a sectional view of a transmitting and receiving unit according to the invention, and FIG. 20B schematically shows another sectional view of a transmitting and receiving unit according to the invention.

The optical transmission component of the invention can be unitized by a combination with a light emitting device or a light acceptance device (transmitting and receiving device). FIG. 20A shows a transmitting and receiving unit 91 unitized by the combination of the optical transmission component (for example, the optical transmission component 21 of the first embodiment) and a plurality of laser diodes (LDs) 92. The laser diodes 92 are arranged in front of the lenses 31 while the optical axes of the laser diodes 92 are aligned with the center axes (cores) of the fiber cores 25. In the transmitting and receiving unit 91, the optical information outputted from the laser diode 92 is condensed with the lens 31, whereby optical information can be coupled to the fiber core 25. Accordingly, in the transmitting and receiving unit 91, the optical information coupling efficiency between the laser diode 92 and the fiber core 25 can be enhanced because the peel-off and the bubble are hardly generated in the boundary of the bonding agent 35.

Figure 20B:
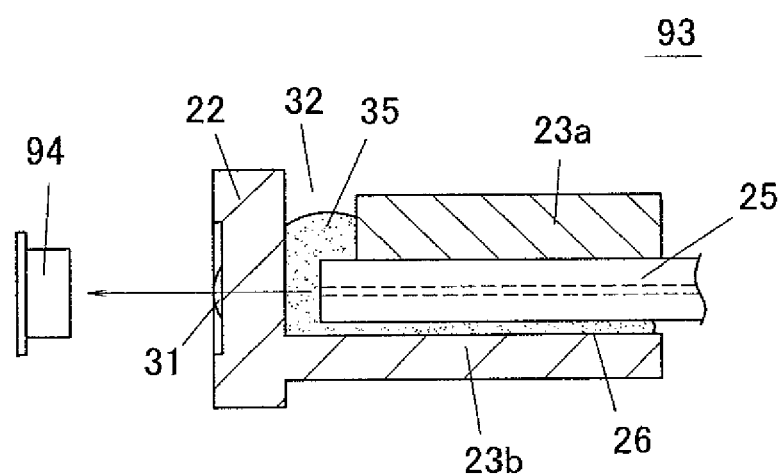

FIG. 20B shows a transmitting and receiving unit 93 unitized by the combination of the optical transmission component (for example, the optical transmission component 21 of the first embodiment) and a plurality of photodiodes 94. The photodiodes 94 are arranged in front of the lenses 31 while the optical axes of the photodiodes 94 are aligned with the center axes (cores) of the fiber cores 25. In the transmitting and receiving unit 93, the optical information outputted from the laser diode 92 is condensed with the lens 31, whereby the optical information can be condensed to the photodiode 94. Accordingly, in the transmitting and receiving unit 93, the optical information coupling efficiency between the fiber core 25 and the photodiode 94 can be enhanced because the peel-off and the bubble are hardly generated in the boundary of the bonding agent 35.

Eighth Embodiment

Figure 21:
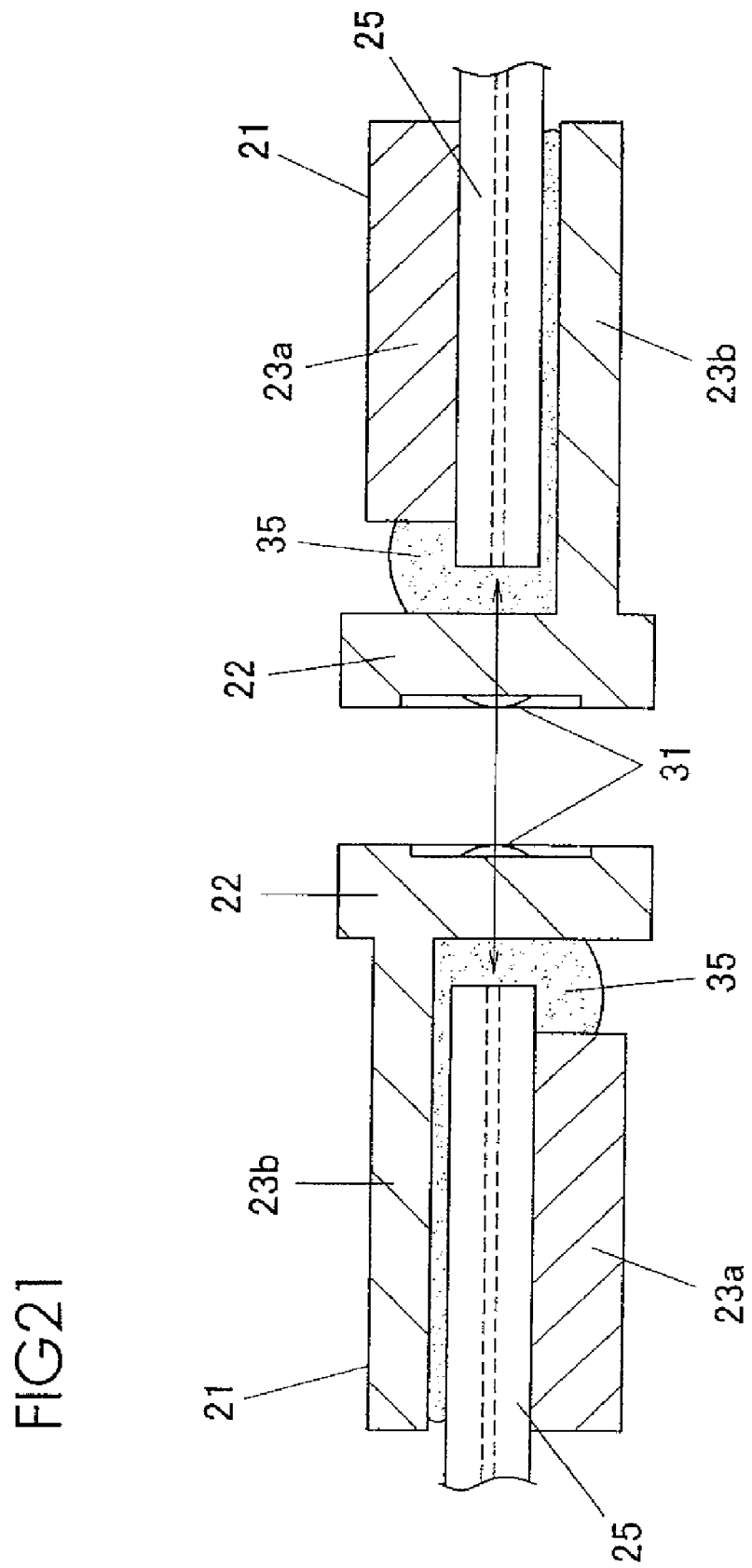
FIG. 21 schematically shows a sectional view of a state in which two optical transmission components are connected to each other.

FIG. 21 schematically shows a sectional view of a state in which the two optical transmission components (for example, the optical transmission components 21) are connected to each other. In the eighth embodiment, in order to couple the same channels to each other, the optical transmission components are coupled while one of the optical transmission components is vertically inverted, and the optical transmission components are coupled to each other by the guide pin.

What is claimed is:

1. A method of producing an optical transmission component comprising the steps of:
    performing integral resin molding while at least a part of an optical transmission line holder and an optical function portion are connected by a connection portion, the optical transmission line holder and the optical function portion being disposed with a space;
    holding the optical transmission line in the optical transmission line holder while an end face of the optical transmission line is located across the space from the optical function portion;
    filling a gap portion between the optical function portion and the end face of the optical transmission line with a bonding agent having a linear expansion coefficient smaller than that of the connection portion; and
    curing the bonding agent at an atmosphere temperature higher than an upper limit of a keeping temperature of the optical transmission component.

2. The optical transmission component producing method according to claim 1, wherein the bonding agent is an ultraviolet curing resin having optical transparency in a wavelength band of light propagating through the optical transmission line.

3. The optical transmission component producing method according to claim 1, wherein the atmosphere temperature is lower than a boiling point of the bonding agent when the bonding agent is cured.

4. The optical transmission component producing method according to claim 1, wherein the atmosphere temperature is 5° C. to 15° C. higher than the upper limit of the keeping temperature when the bonding agent is cured.

5. The optical transmission component producing method according to claim 1, wherein the bonding agent with which the gap portion between the optical function portion and the end face of the optical transmission line is filled has a thickness of 10 μm or more.

6. The optical transmission component producing method according to claim 1, wherein the space is opened to an outside above the gap portion in which the optical function portion and the end face of the optical transmission line face each other, and the bonding agent is injected from the opened portion of the space into the gap portion between the optical function portion and the end face of the optical transmission line.

7. The optical transmission component producing method according to claim 1, wherein a portion located above the gap portion in the space is filled with the bonding agent for replenishment when the bonding agent is injected into the gap portion between the optical function portion and the end face of the optical transmission line.

8. A method of producing an optical transmission component comprising the steps of:
    performing integral resin molding while at least a part of an optical transmission line holder and an optical function portion are connected by a connection portion, the optical transmission line holder and the optical function portion being disposed with a space;
    holding the optical transmission line in the optical transmission line holder while an end face of the optical transmission line is located across the space from the optical function portion;
    filling a gap portion between the optical function portion and the end face of the optical transmission line with a bonding agent having a linear expansion coefficient larger than that of the connection portion; and
    curing the bonding agent at an atmosphere temperature lower than a lower limit of a keeping temperature of the optical transmission component.

9. The optical transmission component producing method according to claim 8, wherein the bonding agent is an ultraviolet curing resin having optical transparency in a wavelength band of light propagating through the optical transmission line.

10. The optical transmission component producing method according to claim 8, wherein the atmosphere temperature is a temperature at which the curing of the bonding agent is not interrupted.

11. The optical transmission component producing method according to claim 8, wherein the bonding agent with which the gap portion between the optical function portion and the end face of the optical transmission line is filled has a thickness of 10 μm or more.

12. The optical transmission component producing method according to claim 8, wherein the space is opened to an outside above the gap portion in which the optical function portion and the end face of the optical transmission line face each other, and the bonding agent is injected from the opened portion of the space into the gap portion between the optical function portion and the end face of the optical transmission line.

13. The optical transmission component producing method according to claim 8, wherein a portion located above the gap portion in the space is filled with the bonding agent for replenishment when the bonding agent is injected into the gap portion between the optical function portion and the end face of the optical transmission line.

* * * * *